United States Patent
Mabey et al.

(10) Patent No.: US 10,395,025 B1
(45) Date of Patent: Aug. 27, 2019

(54) METHOD FOR RECORDING STROKE DATA MADE ON A TOUCH SENSITIVE INTERACTIVE DEVICE

(71) Applicant: Quirklogic, Inc., Calgary (CA)

(72) Inventors: Michael Howatt Mabey, Calgary (CA); Alfonso Fabian de la Fuente, Victoria (CA); Nashirali Samanani, Calgary (CA)

(73) Assignee: QuirkLogic, Inc., Calgary (CA)

( * ) Notice: Subject to any disclaimer, the term of this patent is extended or adjusted under 35 U.S.C. 154(b) by 188 days.

(21) Appl. No.: 15/388,758

(22) Filed: Dec. 22, 2016

Related U.S. Application Data

(60) Provisional application No. 62/275,108, filed on Jan. 5, 2016.

(51) Int. Cl.
  *G06F 21/00* (2013.01)
  *G06F 21/44* (2013.01)
  *G06F 3/0488* (2013.01)

(52) U.S. Cl.
  CPC .......... *G06F 21/44* (2013.01); *G06F 3/04883* (2013.01)

(58) Field of Classification Search
  CPC ...... G06F 21/31; G06F 19/00; G06F 21/6245; G06F 21/34; G06F 21/32
  See application file for complete search history.

(56) References Cited

U.S. PATENT DOCUMENTS

| | | | |
|---|---|---|---|
| 2001/0029583 A1* | 10/2001 | Palatov | G06Q 30/02 713/193 |
| 2016/0011733 A1* | 1/2016 | Mann | G06F 3/0484 715/709 |

* cited by examiner

*Primary Examiner* — Ghazal B Shehni
(74) *Attorney, Agent, or Firm* — Chamberlain, Hrdlicka, White, Williams & Aughtry

(57) ABSTRACT

A system and method for storing data input on an interactive device directly to a removable media device. The method includes detecting connection of a removable media device by an interactive device, authenticating the removable media device using an identification device operatively connected to the removable media device, upon authentication of the removable media device and when a session exists on the interactive device, determining whether a user of the removable media device is a same user of the session, when the user of the removable media device is the same user of the session, automatically copying stroke data on the interactive device to the removable media device, and upon authentication of the removable media device and when a session does not exist on the interactive device, creating a new session associated with the user of the removable media device, and performing an insertion default action.

19 Claims, 16 Drawing Sheets

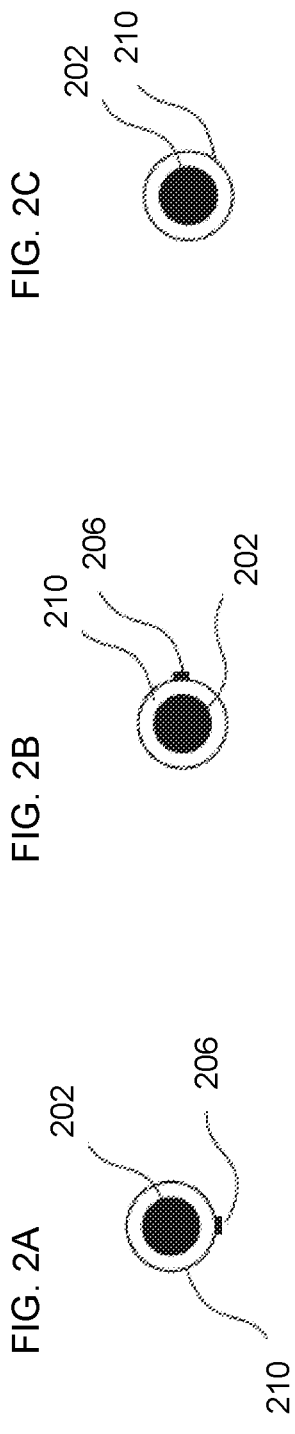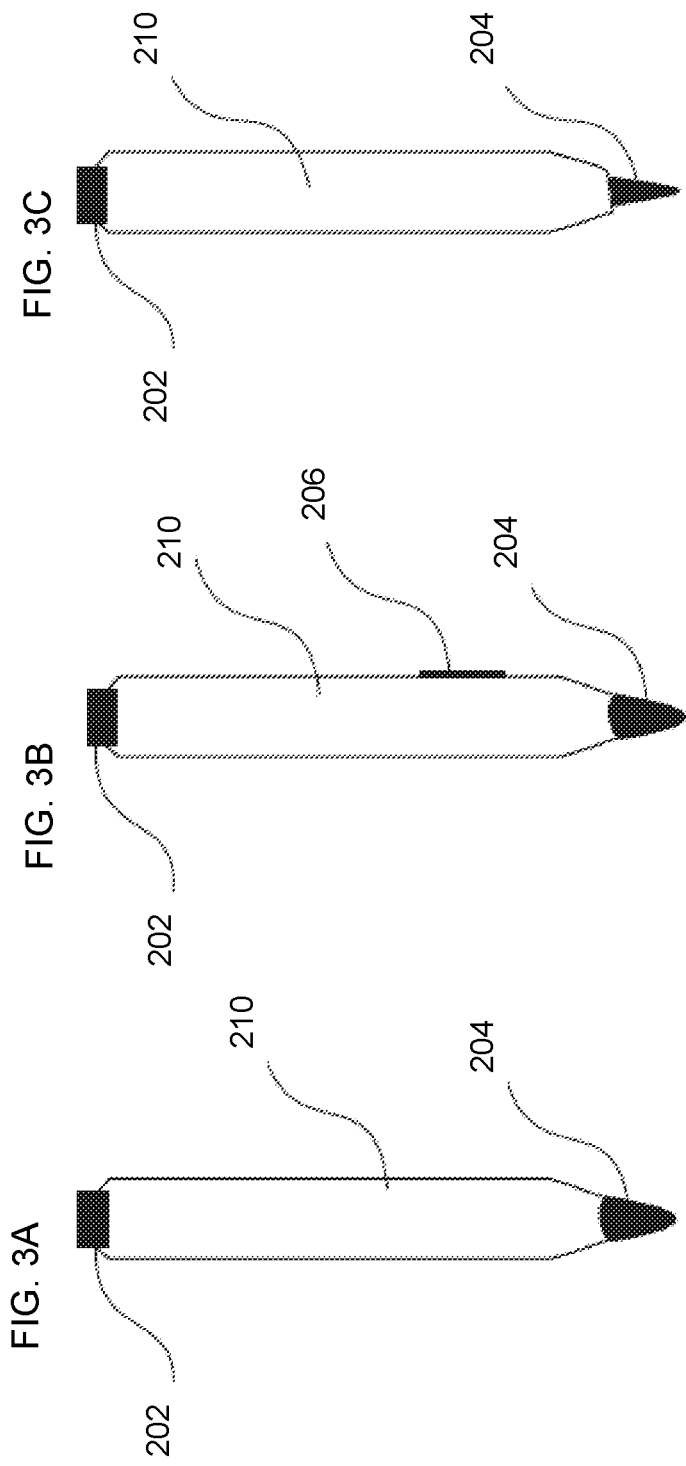

Pages of e-presentation

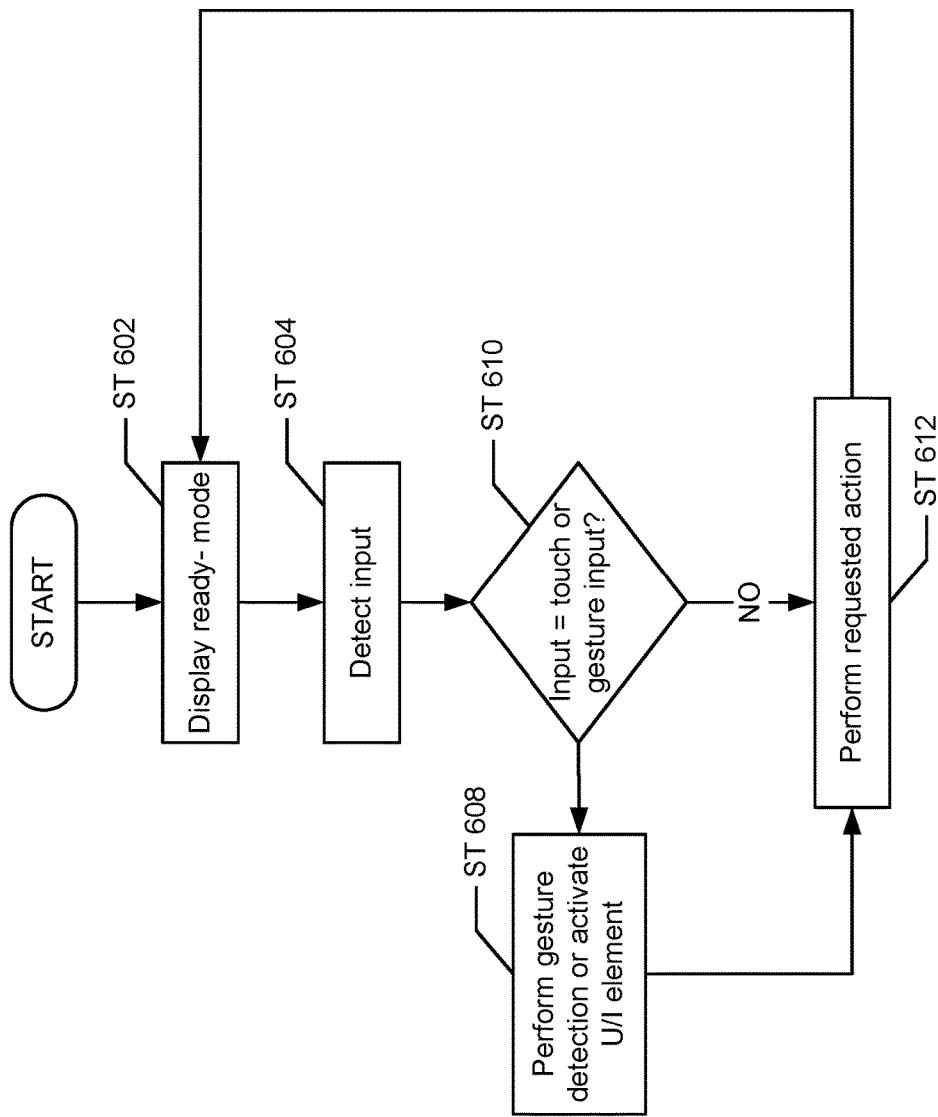

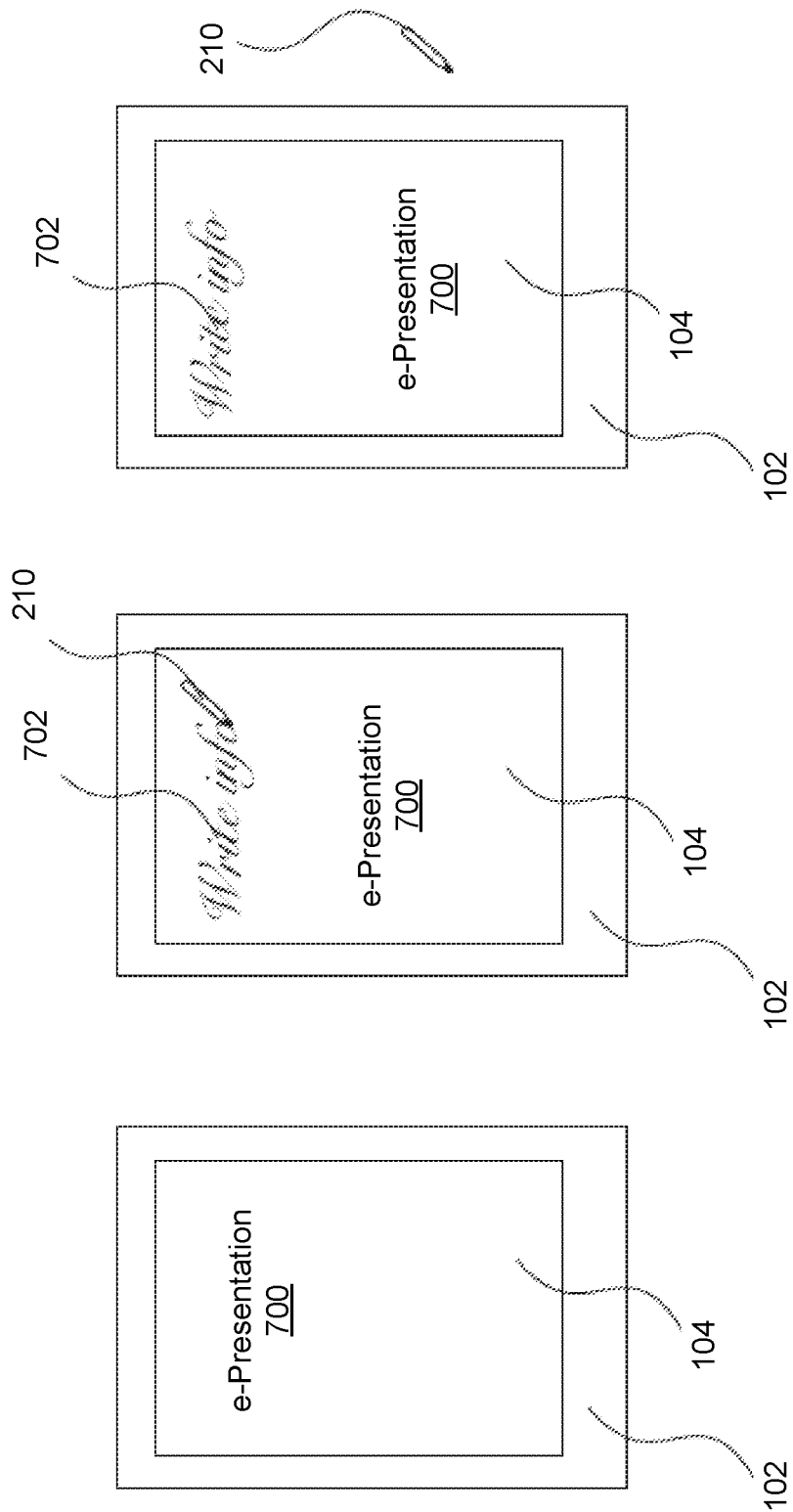

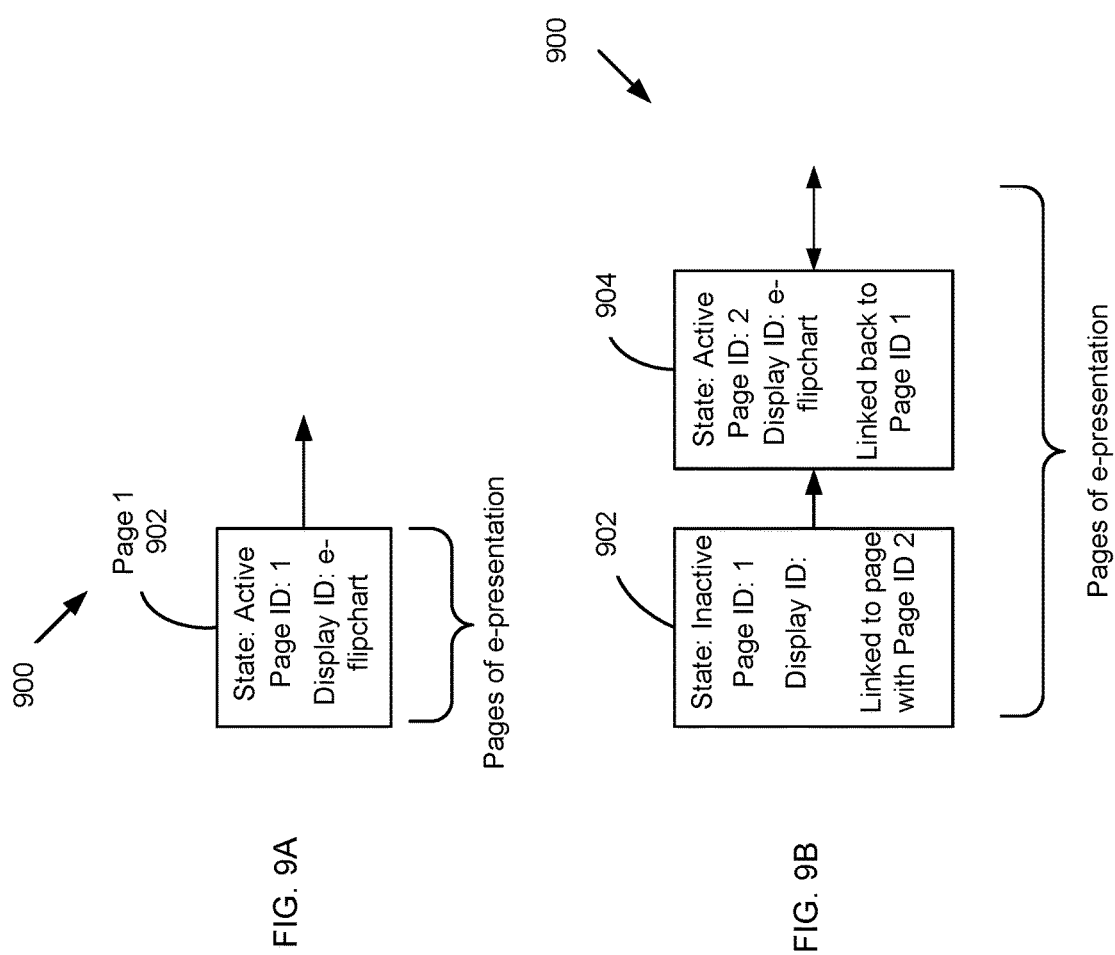

METHOD FOR RECORDING STROKE DATA MADE ON A TOUCH SENSITIVE INTERACTIVE DEVICE

CROSS-REFERENCE TO RELATED APPLICATIONS

This application claims priority under 35 U.S.C. § 119(e) to U.S. Provisional Patent Application Ser. No. 62/275,108, filed on Jan. 5, 2016, which is incorporated herein by reference in its entirety.

BACKGROUND

Flipcharts have not changed significantly over 100 years. And to this day it is very common for any meeting room to have some form of a flipchart for writing notes or sharing ideas. Use of the flipchart has been augmented by blackboards and/or whiteboards for presenting information. These tools continue to thrive in the office environment despite the introduction of digital projectors, interactive displays, laptops, and mobile phone technology. Whiteboards and flipcharts are advantageous because they are transparent to users, they are easy to set up and use, and have no technological barriers. Although technology has now advanced in the office environment, whiteboards and flipcharts are fundamentally unchanged.

SUMMARY

In general, in one aspect, the invention relates to a system for storing data. The system comprises: an interactive device comprising an interactive display and a removable media port configured to receive a removable media device, wherein the interactive device is configured to receive, via the interactive display, stroke input, and automatically store the stroke input onto the removable media device as stroke data when the removable media device is connected to the removable media port; the removable media device comprising a data repository configured to store the stroke data, and metadata associated with the stroke data; and an identification device, wherein the identification device is used by the interactive device to authenticate the removable media device.

In general, in one aspect, the invention relates to a method for storing data. The method includes: detecting connection of a removable media device by an interactive device; authenticating the removable media device using an identification device operatively connected to the removable media device; upon authentication of the removable media device and when a session exists on the interactive device, determining whether a user of the removable media device is a same user of the session; when the user of the removable media device is the same user of the session: automatically copying stroke data on the interactive device to the removable media device; and upon authentication of the removable media device and when a session does not exist on the interactive device, creating a new session associated with the user of the removable media device and performing an insertion default action.

In general, in one aspect, the invention relates to a system for storing data. The system comprises: an interactive device comprising an interactive display and a removable media port configured to receive a removable media device, wherein the interactive device is configured to receive, via the interactive display, stroke input, and automatically store the stroke input onto the removable media device as stroke data when the removable media device is connected to the removable media port; the removable media device comprising a data repository configured to store the stroke data, and metadata associated with the stroke data; and an identification data, wherein the identification data is used by the interactive device to authenticate the removable media device.

In general, in one aspect, the invention relates to a method for storing data. The method includes: detecting connection of a removable media device by an interactive device; authenticating the removable media device using an identification data contained within the removable media device; upon authentication of the removable media device and when a session (i.e. a user is already logged in) exists on the interactive device, determining whether a user of the removable media device is a same user of the session; when the user of the removable media device is the same user of the session: automatically copying stroke data on the interactive device to the removable media device; and upon authentication of the removable media device and when a session does not exist on the interactive device, creating a new session associated with the user of the removable media device and performing an insertion default action.

Other aspects of the invention will be apparent from the following description and the appended claims.

BRIEF DESCRIPTION OF DRAWINGS

FIGS. 2A-2C show hardware for operating an electronic flipchart in accordance with one or more embodiments.

FIGS. 3A-3C show hardware for operating an electronic flipchart in accordance with one or more embodiments.

FIG. 6 shows a flowchart in accordance with one or more embodiments.

FIG. 7A-7F show examples of an electronic flipchart in accordance with one or more embodiments.

FIG. 9A-9C show examples of storing data for an electronic flipchart in accordance with one or more embodiments.

DETAILED DESCRIPTION

Figure 1A:
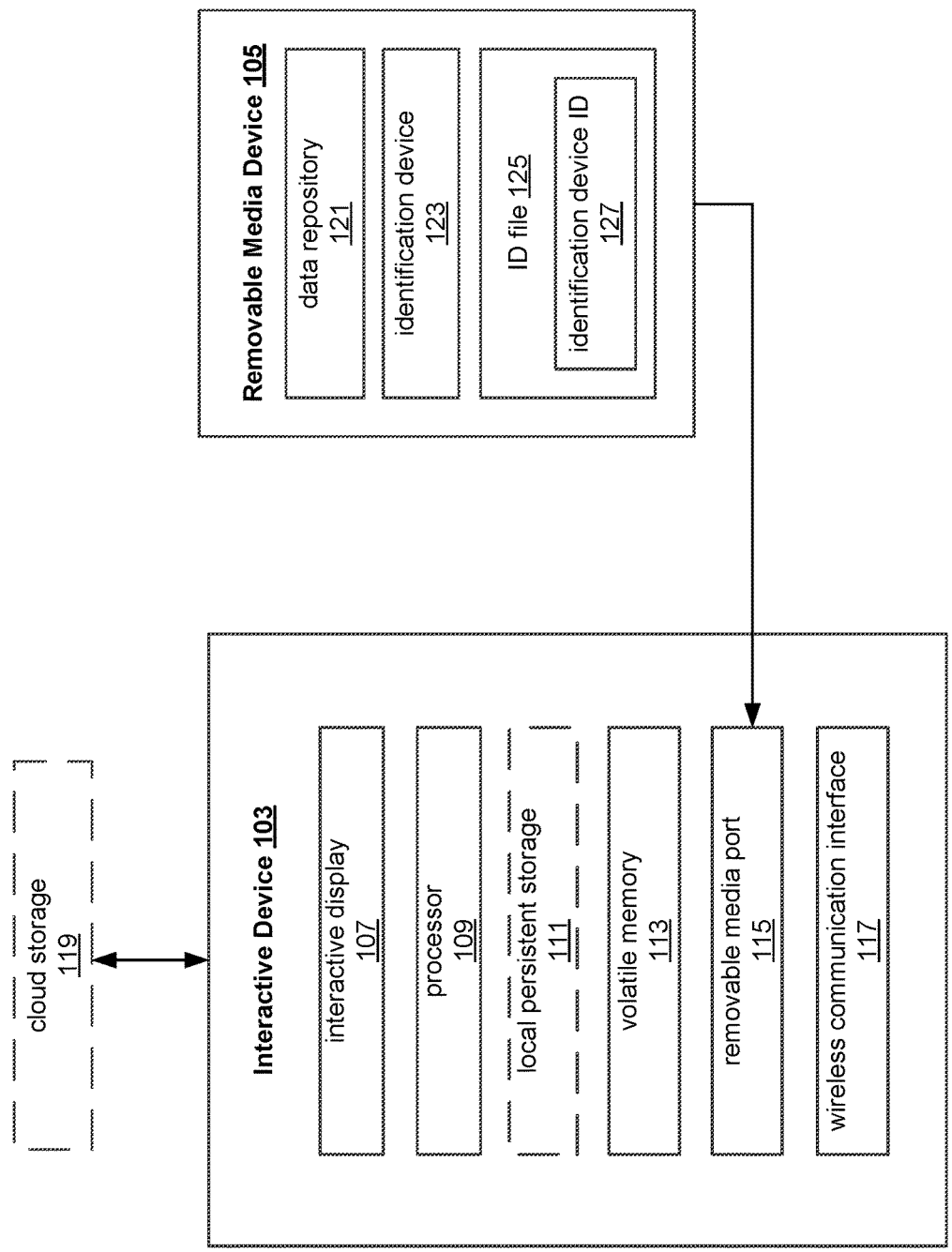
FIG. 1A shows a system in accordance with one or more embodiments of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-14, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for storing data input on an interactive device directly to a removable media device. More specifically, embodiments of the invention are directed to the seamless storage, in real-time (or near real-time), of stroke data input on a touch-sensitive interactive device to a pre-configured removable media device.

FIG. 1A shows a system in accordance with one or more embodiments of the invention. The system includes an interactive device (103) and a removable media device (105). Each of the aforementioned components is described below.

In one or more embodiments of the invention, the interactive device (103) is any physical system with an interactive display (107), a processor (109), a volatile memory (113), a removable media port (115), and a wireless communication interface (117). The interactive device (103) may optionally include local persistent storage (111). Further, the interactive device (103) may be operatively connected to cloud (or remote) storage (119) in a cloud computing environment. In one or more embodiments of the invention, the interactive device (103) may be any interactive device capable of receiving input, such as a reflective display device, an interactive whiteboard, an electronic tablet, or any other suitable device. For example, the interactive device (103) may be an e-flipchart apparatus as described in FIGS. 1B-10.

The interactive device (103) includes functionality to receive at least one stroke input (not shown) on the interactive display (107). Additionally, the interactive device (103) includes functionality to process, using the processor (109), and store, the stroke input (described below) as stroke data (described below). The stroke data may be initially stored in the volatile memory (113), in accordance with the embodiments shown in FIG. 13. Volatile memory (113) may be any volatile memory including, but not limited to, Dynamic Random-Access Memory (DRAM), Synchronous DRAM, SDR SDRAM, and DDR SDRAM. Furthermore, the interactive device (103) is configured to copy the stroke data from the volatile memory (113) and automatically store the stroke data onto the removable media device (105), when the interactive device (103) is connected to the removable media device (105) via the removable media port (115), in accordance with the embodiments shown in FIG. 13. Alternatively, or in addition to storing the stroke data in the removable media device (105), the interactive device may store the stroke data in the local persistent storage (111) of the interactive device (103). Local persistent storage (111) may be, for example, solid state memory, optical storage, magnetic storage, or any other medium capable of persistently storing data. Further, stroke data may optionally be stored on remote persistent storage or in a cloud computing environment having cloud storage (119), such as a web-based storage environment.

Continuing with the discussion of FIG. 1A, the wireless communication interface (117) of the interactive device (103) is any physical device with a wireless network interface card or similar wireless network component. For example, the wireless communication interface (117) may be a wireless network interface card that is integrated within the interactive device (103) or a removable wireless network Universal Serial Bus (USB) device. Additionally, the wireless communication interface (117) includes functionality to receive a serial number (not shown) of an identification device (123), or an ID file (125) of the removable media device (105), and use the serial number to authenticate the removable media device (105). For example, the wireless communication interface (117) may be an NFC reader (or any other suitable interface) or a Bluetooth connection (which may be any implementation of Bluetooth) that facilitates the transfer of the serial number of the identification device (123) from the removable media device (105) to the interactive device (103), for authentication of the removable media device (105) by the interactive device (103).

In one embodiment of the invention, the interactive display (107) is a user interface with a display screen. The display screen may be a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., a video projector, a flap display, a flip disk display, a digital micro-mirror device (DMD), an interferometric modulator display (IMOD), an uni-pixel display (FTIR), and a telescopic pixel display) In one or more embodiments, the interactive display (107) includes at least a touch-sensitive portion that is capable of receiving and display stroke input.

In one embodiment of the invention, the stroke input, displayed by the interactive display (107) and subsequently received and processed by the interactive device (103) as discussed above, may be any digital pixel or marking made by touch input on the touch-sensitive portion of the interactive display (107), or by input on the interactive display (107) via a digital marker, digital keyboard, or other input device or program that may be physically or operatively connected to the interactive display (107). For example, the stroke input may be a dot, a line, a letter, a drawing, a word, or a series of words made on the interactive display (107) using a digital marker, stylus pen, or user touch input.

In one embodiment of the invention, the stroke data may include, but is not limited to, location data for the stroke (e.g., the x, y, coordinates of the detected locations of the stroke input), optional stroke pressure data for the stroke (e.g. the amount of pressure that was detected at each location point), stroke characteristics that can be used to render the stroke from the location data and optional pressure data (e.g. stroke line width, stroke type (e.g. pen, pencil, marker), stroke color), a timestamp associated with the stroke input, a user that produced the stroke (e.g., the user that used a stylus to draw a line on the interactive device), the type of input that was used to generate the stroke input (e.g., stylus, finger(s), etc.), information about the stylus (if a stylus was used) (e.g., the width of the tip of the stylus, etc.). In one or more embodiments of the invention, the stroke data may include the location of the pixels that are changed as a result of the stroke (e.g., the pixels that make up the line(s) and/or curve(s) that were created as a result of the stroke input), In one or more embodiments of the invention, the removable media device (105) includes a data repository (121), an identification device (123), and an ID file (125). For example, the removable device (105) may be a USB flash drive, a memory card, or any other suitable portable storage device.

The data repository (121) is any location (or set of locations) on the storage medium within the removable media device (105) that includes the functionality to store the stroke data and metadata associated with the stroke data. In one embodiment of the invention, the stroke data is defined as the stroke input from the interactive display (107) that has been processed and converted by the processor (109) to stroke data.

The stroke data may be stored onto the removable media device (105), the local persistent storage (111), and/or cloud storage (119) connected to the interactive device (103). Further, in one or more embodiments of the invention, the data repository (121) is configured to store stroke data in a database format. For example, the stroke data may be stored as a plain text flat file, readable by software on the interactive device that is capable of reconstructing the stroke data to its original state.

In one or more embodiments of the invention, metadata associated with the stroke data that may be stored in the data repository (121) may be a last display state of the interactive display (107). The last display state is a recordation of the final state of the stroke data by the data repository (121), as displayed immediately before the removable media device is operatively removed from the interactive device (103). Additionally, metadata may also include timestamps to indicate creation or modification dates, file size indicators, and other indicators that may be used by the interactive device to locate and retrieve a specific subsection of data stored in the data repository.

The identification device (123) is any physical device or digital implementation that has an identifier, such as a serial number, that is operatively connected to the removable media device (105) in a manner that associates the identification device (123) with the removable media device (105), to facilitate the authentication of the removable media device. For example, the identification device (123) may be a Near Field Communications (NFC) chip or a Subscriber Identity Module (SIM) card, which may be electrically wired within, physically affixed upon, or physically or wirelessly connected to, the removable media device. Further, the identification device (123) is utilized by the interactive device (103) to authenticate the removable media device (105), using the serial number of the identification device (123).

The ID file (125) is any electronic file, located within the removable media device (105), that includes an identification device ID (127). In one embodiment of the invention, the identification device ID identifies the identification device and/or the removable media device. The identification device ID may be: (i) a serial number of the identification device or the removable media device, (ii) a device ID (other than a serial number) associated with the identification device or the removable media device, and/or (iii) a value based on and/or derived from at least a portion of (i) and/or (ii). In one embodiment of the invention, the value in embodiment (iii) may be generated using, for example, a hash function, an encryption function, etc. Other functions (or combinations of functions maybe used without departing from the invention). The identification device ID may include numbers, letters, and/or symbols.

The ID file (125) may also include user login credentials (not shown), a reference pointer to the metadata (not shown), a default insertion action (not shown), and an at least one default removal action (not shown). Each of these components is described below.

Figure 11:
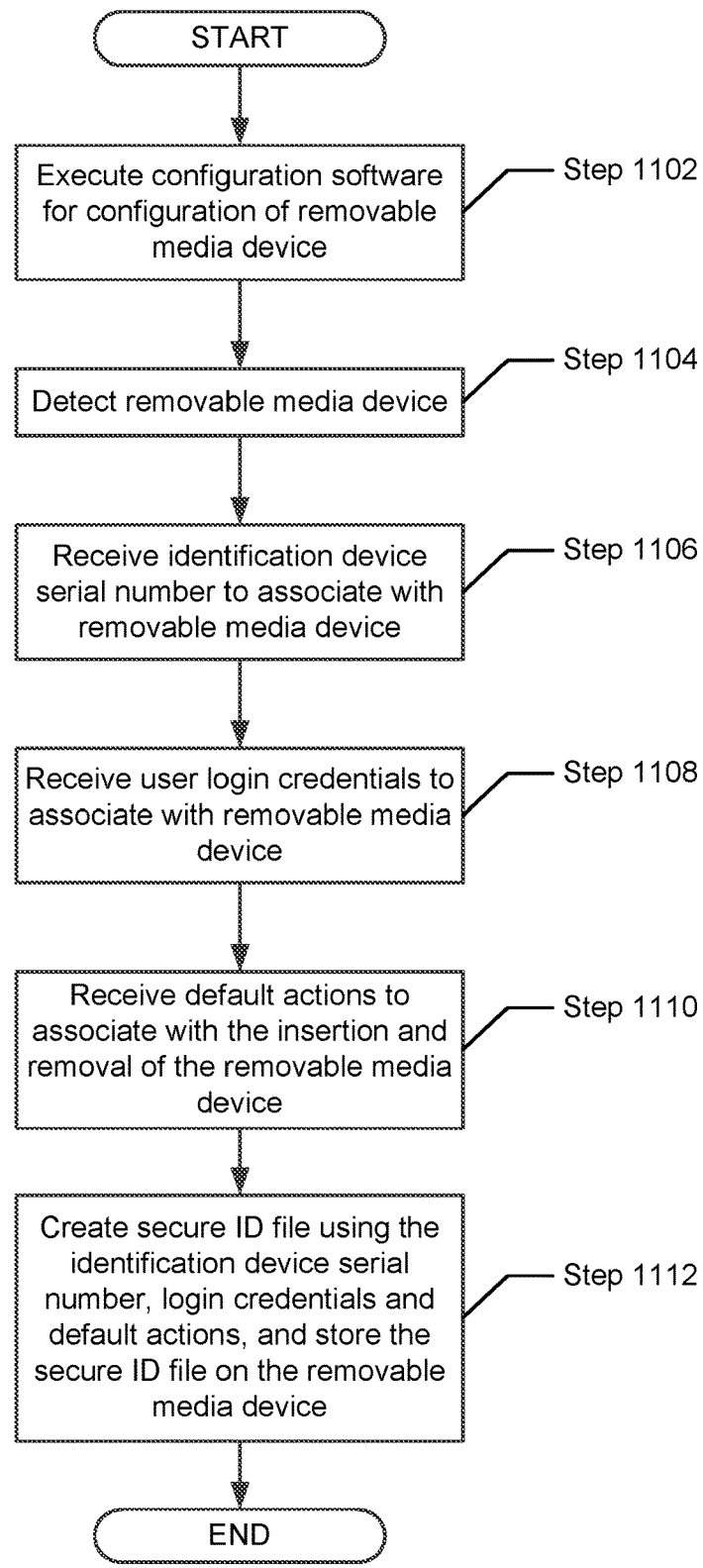
FIG. 11 shows a flowchart for initializing a removable media device in accordance with one or more embodiments of the invention.

In one embodiment of the invention, the ID file (125) is pre-configured, during the initialization of the removable media device (105), in order to authenticate the removable media device (105) to the interactive device (103), as shown in FIG. 11.

In accordance with one or more embodiments of the invention, authenticating the removable media device includes obtaining an identification device ID (described above) from the identification device (123) and comparing the obtained identification device ID to the identification device ID (127) of the ID file, upon connecting the removable media device (105) to the interactive device (103). Further, authentication of the removable device (105) may be performed using a separate channel and/or process than the one used to connect the removable media device (105) to the interactive device (103). For example, in accordance with one or more embodiments of the invention, the removable media device (105) may be authenticated by the interactive device (103) through the wireless communication interface (117) configured to receive the serial number from the identification device (123), as described above. At the same time, the removable media device (105) may be operatively connected to the interactive device (103) through a removable media port (115), to facilitate the storage of data using the data repository (120) and the authentication of a user of the removable media device (105) using the user login credentials, as well as to facilitate the retrieval of data using the reference pointer to the metadata, and the management of data using the default insertion and default removal actions.

In another example, the removable media device may be authenticated as follows: (i) obtaining a value (e.g., a serial number, a device ID) from an identification device (described above); (ii) applying a function (e.g., a hash function or an encryption function) to at least a portion of the value obtained in (i) to generate an identification device ID; (iii) obtaining an identification device ID from the ID file; and (iv) comparing the identification device ID generated in (ii) to the identification device ID obtained in (iii) to determine whether they match. If there is a match, then the removable media device is authenticated.

In another example, the removable media device may be authenticated as follows: (i) obtaining an identification device ID from an identification device (described above); (ii) obtaining an identification device ID from the ID file; and (iii) comparing the identification device ID obtained in (i) to the identification device ID obtained in (ii) to determine whether they match. If there is a match, then the removable media device is authenticated.

In accordance with one or more embodiments of the invention, the user login credential includes information, such as a user ID and a password (or other credentials), to facilitate the interactive device's (103) authentication of a particular user to the removable media device (105). Additionally, the interactive device (103) authenticates the user of the removable media device (105), using the user login credentials, before the stroke data, including any stroke data stored in the volatile memory (113) of the interactive device (103), is automatically stored on the removable media device (105). The reference pointer to the metadata includes information such as the location of the last display state of the interactive display, to be used to facilitate the retrieval of the stroke data from the removable media device (105), by the interactive device (103).

In accordance with one or more embodiments of the invention, the default insertion action includes an instruction to be followed by the interactive device (103), upon detecting the insertion of and after the authentication of, the removable media device (105). For example, the default insertion action may include automatic display of the last state of the stroke using the reference pointer to the metadata, as previously mentioned above, and/or storage of stroke data in a location other than the removable media device (105). The default removal action includes certain default actions to be taken upon the detection of the removal of the removable media device (105) by the interactive device (103). For example, the default removal action may include automatic deletion of all traces of the stroke data from all components of the interactive device (103).

Those skilled in the art will appreciate that the default insertion and the default removal actions may be pre-configured on the removable media device before it is connected to the interactive device. By doing so, the user of the removable media device may not need to provide further instruction on how the stroke data should be saved, where the stroke data should be saved, or whether all traces of the stroke data should be removed from the interactive device upon removal of the removable media device.

While FIG. 1A shows a configuration of components, system configurations other than those shown in FIG. 1A may be used without departing from the scope of the invention. For example, various components may be combined to create a single component. As another example, the functionality performed by a single component may be performed by two or more components.

The following section describes an e-flipchart apparatus as described in FIGS. 1B-10.

Figure 1B:
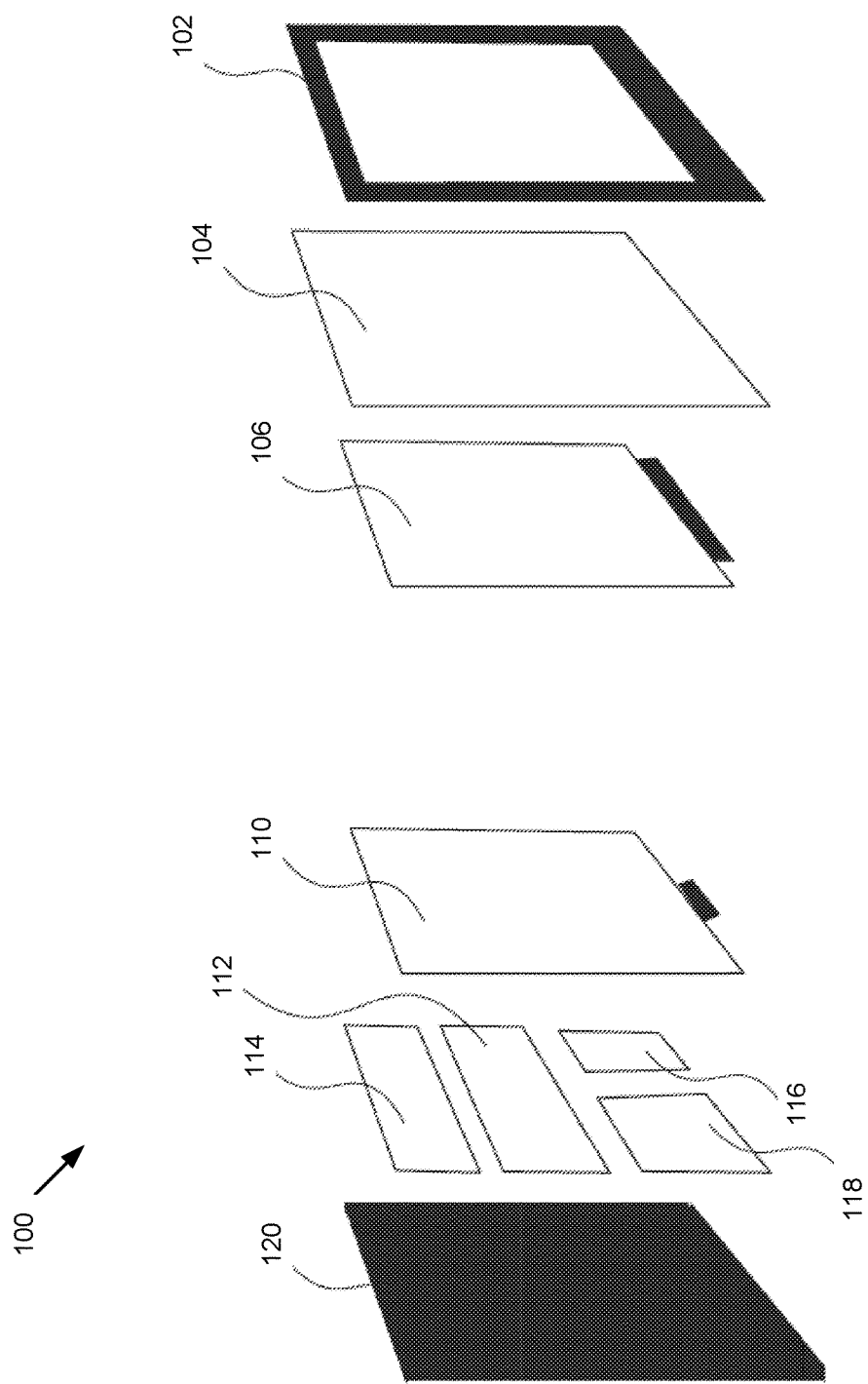
FIG. 1B shows an apparatus in accordance with one or more embodiments.

Turning to FIG. 1B, FIG. 1B shows a schematic diagram of an apparatus of an e-flipchart (also referred to as an e-flipchart apparatus) in accordance with one or more embodiments of the invention. While FIG. 1B shows a configuration of components, other configurations may be used without departing from the scope of the invention. For example, various components may be combined to create a single component. As another example, the functionality performed by a single component may be performed by two or more components.

Turning to FIG. 1B, in accordance with one or more embodiments of the invention, the apparatus (100) may include one or more hardware elements, each having specific functionality. The main structure of the e-flipchart apparatus is formed between a back panel (120) and a front frame (102). In one or more embodiments of the invention, the front frame is a clear, opaque, or translucent material and includes an active area on which content may be displayed. In one or more embodiments of the invention, the back panel (120) is a rigid mechanical support structure made of a solid material, for example, plastic or metal. In between the back panel (120) and the front frame (102) is a low-power, reflective display (106). In one embodiment of the invention, the reflective display (106) may be viewed as an output device that, through reflection, harnesses ambient light in order to present content. For example, the reflective display (106) may host slow refresh rates, monochromatic coloring (e.g., black and white, or gray scale shading), and the presentation of low contrasting definition. However, on the other hand, the reflective display (106) may have one or more of the following features: (i) very low power consumption; (ii) the readability of content outdoors under sunlight; and (iii) the providing of strain relief on the eyes of a user. As such, in one embodiment of the invention, fundamental static digital media, such as monochromatic text and still images, may be delegated to a reflective display (106) for presentation. Examples of a reflective display include, but are not limited to, a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., Flap Display, digital micro-mirror device).

In one or more embodiments of the invention, at least one portion of the reflective display (106) of the e-flipchart apparatus may be bi-stable. In one embodiment of the invention, the reflective display may correspond to the reflective displayed described in U.S. Pat. No. 5,930,026. The invention is not limited to the reflective display described in the above referenced patent.

Continuing with the discussion of FIG. 1B, in front of the reflective display (106) is a layer having at least one touch portion which may be a transparent rigid or semi-rigid board (104), or a frame that uses edge sensors, such as Infra-red or optical sensing technology. In another embodiment, the layer having at least one touch portion (104) may be a capacitive film layer. In one or more embodiments, the layer having at least one touch portion (104) may only cover a portion of the reflective display, with the remaining surface area of the reflective display (106) being covered by non-touch sensitive material which may or may not be clear, opaque, translucent, transparent and/or non-transparent. In the back of the reflective display (106) is an optional electromagnetic layer, which may be an electromagnetic board (110). By combining the electromagnetic layer (110) and the layer having at least one touch portion (104), at least a dual system for touch input is obtained. In one or more embodiments, touch input may include a finger(s) and/or a touch by a digital marker or digitizer.

In one or more embodiments of the invention, the electromagnetic layer (110) is configured to generate an electromagnetic field capable of detecting a digital marker or digitizer (see e.g., FIGS. 2A-3C) when such a tool is used to provide an input to the e-flipchart. The electromagnetic layer (110) includes wires (not shown) that allows the electromagnetic layer (110) to transmit and detect input signals. In one or more embodiments of the invention, the electromagnetic board (110) is configured to determine a position of the touch input (described above) on the e-flipchart by detecting pressure or changes in the generated electromagnetic field caused by a designated portion of the touch input, for example, the tip of a digital marker and/or pressure applied by one or more fingers.

In one or more embodiments of the invention, the front frame (102) includes an active area or region with an active display, and an active input method that includes at least two input capabilities: the ability to detect a digital marker or digitizer and the ability to accept touch input from one or more finger touch points. Further, the apparatus (100) is configured to respond to each detected input type (see e.g., FIG. 6). For example, detecting a digital marker input may result in a line being drawn on the reflective display, while touching the same area with a finger may pan or zoom the display area.

Continuing with FIG. 1B, controller (114) includes hardware and software/firmware to control the overall operation of the e-flipchart. More specifically, the controller (114) may include one or more processors (CPUs), persistent storage, and/or volatile memory. Persistent storage may include, for example, magnetic storage, optical storage, solid state storage (e.g., NAND Flash, NOR Flash, etc.), or any combination thereof. Volatile memory may include RAM, DRAM, or any combination thereof. In one or more embodiments of the invention, all or a portion of the persistent storage and/or volatile memory may be removable. In one or more embodiments, the persistent storage may include software instructions for executing operations of the e-flipchart. Specifically, the persistent storage may be configured to store software and/or firmware specific to e-flipchart operations. In one or more embodiments of the invention, the built-in CPU/processors of the controller (114) may execute an operating system and the software which implements e-flipchart functionality.

The controller (including components therein) (114) is powered by a battery and/or a power supply (112). In one or more embodiments, controller (114) is configured to detect and process input signals. For example, when an object touches the layer having at least one touch portion (104), a signal is sent to the controller (114) for detection of the input type and processing of the input. Further, the controller is configured to store e.g., in persistent storage and/or volatile memory, each stroke (in the form of touch input or digital marker) after such an action is performed on the e-flipchart (100) (see e.g., FIG. 6). In other words, the controller (114) is configured to store each stroke or action as it is produced in the active area of the front frame (102) of the e-flipchart apparatus (100). In one or more embodiments of the invention, the controller (114) includes functionality to implement the methods shown and described in FIGS. 6-8. Further, while the controller (114) has been described as a combination of hardware and software, the controller may be implemented entirely within hardware without departing from the scope of the invention.

In one embodiment of the invention, the e-flipchart may include one or more external communication interfaces (116). The communication interfaces permit the e-flipchart to interface with external components. The communication interfaces may implement any communication protocol, for example, Bluetooth, IEEE 802.11, USB, etc. The invention is not limited to the aforementioned communication protocols.

In one or more embodiments of the invention, the apparatus (100) of FIG. 1B is a lower-power reflective device that only draws power from the battery/power supply (112) when there is a screen refresh with new information displayed or when a user is drawing or inputting information in the apparatus. In other words, while the apparatus (100) is "always on" and in a mode that is ready to detect an input, the apparatus is in a low power state. When an input is detected by the apparatus (100) on the active area of the front frame (102), the e-flipchart apparatus is configured to change from the low power state to an active state and perform the methods described in FIGS. 6 and 8.

In one or more embodiments of the invention, the e-flipchart apparatus may be deemed to be in an active state when some or all the components on the e-flipchart apparatus are working accepting pen, touch, keyboard and LAN input, processing applications and/or saving data (and/or metadata) to memory. In the active state, the components of the e-flipchart apparatus are drawing energy from the controller (114). In contrast, the e-flipchart apparatus may be deemed to be in a low power state, (or ready-mode) when no pen, touch, keyboard or LAN inputs are detected (for at least a pre-determined period of time), but the apparatus still shows the last content displayed on it (or displays no content). In ready-mode, CPU processes are minimized, scan rate of finger and pen inputs are delayed and overall power consumption of the components in the e-flipchart apparatus are reduced, for example, by at least 50%. Power consumption may be reduced by a different amount without departing from the invention. For example, only the battery and the controller may be drawing power in ready-mode, reducing the overall power consumption of the e-flipchart apparatus to 40% relative to the power consumption of the e-flipchart apparatus when it is in the active mode. The management of the amount of power that is provided to components of the e-flipchart apparatus and the frequency of polling for input is performed by the controller (114). Specifically, the controller (114) may include an energy management process configured to control the state of various components of the e-flipchart apparatus based on whether the e-flipchart apparatus is in ready-mode or in the active mode.

To contrast the two states of the e-flipchart apparatus, in one or more embodiments of the invention, when the reflective display is in ready-mode, the polling for input occurs at a low frequency, for example, the apparatus may scan for input 2-10 times per second. However, once an input is detected by the apparatus, the apparatus may transition to an active state and increase polling to a higher frequency, e.g., 60-120 times per second, in order to capture all the input that may be occurring on the reflective display. Other polling frequencies may be used in the active state and/or in the ready-mode without departing from the invention.

In one embodiment of the invention, the term "low power state" is intended to convey that the power consumption of the e-flipchart apparatus in this state is relatively lower (or less) than the power consumption of the e-flipchart apparatus in the active state.

Though not shown in FIG. 1B, the e-flipchart apparatus may include a camera for detecting certain types of input, e.g., a gesture interpretation.

In one or more embodiments of the invention, the e-flipchart is configured to enable a user to create, modify, store, and share an e-presentation. An e-presentation is described below in FIG. 4.

In one or more embodiments of the invention, the apparatus (100) of FIG. 1B is approximately 42 inches in diagonal with a 3:4 aspect ratio. Those skilled in the art will appreciate that the size of the e-flipchart apparatus is designed to mimic that of a typical paper flipchart; however, the dimensions and size of the reflective display apparatus of FIG. 1B may vary without departing from the scope of the invention. For example, additional dimensions may include 32" 4:3 aspect ratio for a personal sized flip chart, and 55" or 60" for larger collaborative surfaces. Even larger surfaces may vary the aspect ratio to allow for more usable width, without adding unusable height, such as a 9:16 ratio for an 80" diagonal size.

While FIG. 1B describes an e-flipchart with a series of components organized in particular manner, those skilled in the art will appreciate that the location of such various components in the e-flipchart, in particular, the reflective display (106), the layer having at least one touch portion (104), and the optional electromagnetic layer (110) may be arranged in different order without departing from the invention.

FIGS. 2A-2C shows the hardware for the digital marker or digitizer that may be used as one type of input capable of being detected by the e-flipchart apparatus described in FIG. 1B above. Specifically, FIGS. 2A-2C show a top view of the digital marker in the form of a cylinder (210). The top of the digital marker has an electronic eraser (202) and at least one button (206). In one or more embodiments of the invention, the button (206) is software programmable and, when pressed or otherwise activated, is configured to send one or more signals to the e-flipchart. For example, when the button (206) is pressed or otherwise activated, the button (206) may send a wireless signal that is detected by the e-flipchart. Those skilled in the art will appreciate that the button (206) may be hidden or built into the electronic eraser (202). Further, although only one button is shown in FIG. 2A-2C, the digital marker may include more than one button, where each button is separately programmable. In one or more embodiments, when the electronic eraser (202) comes into contact with the e-flipchart, the e-flipchart is configured to remove or otherwise clear content from the corresponding locations on the reflective display. Said another way, the electronic eraser (202) mimics the operation of a traditional eraser.

FIG. 2B shows a different orientation (i.e., a side view with a zero degree rotation of the cylinder) of the digital marker or digitizer, in which the button (206) is located at the side of the electronic eraser (202) rather than at the bottom of the electronic eraser (202). FIG. 2C shows another top view of the digital marker, in which the cylinder is rotated 90 degrees. In FIG. 2C, the button (not shown) is hidden from view.

FIGS. 3A-3C depict side views of the digital marker or digitizer in accordance with one or more embodiments of the invention. In FIGS. 3A-3C, the entire length of the cylinder (210) form of the digital marker can be seen. In FIG. 3A, on a top end of the digital marker, the electronic eraser (202) is shown. In addition, the tip (204) of the digital marker or digitizer is shown on a bottom end of the cylinder (210). The tip (204) material may be selected such that the tip (204) slides easily over the writing surface. Materials for the tip (204) may include, but are not limited to, high density polyoxyethylene, hard felt, elastomer, polyoxymethylene, polyacetal, or polyoxyethylene. Other materials may be used without departing from the invention.

In one or more embodiments of the invention, the tip (204) of the digital marker may be used to draw or write directly on the active area of the front frame (102) of the e-flipchart apparatus. In FIG. 3B, the button (206) is shown on a side of the cylinder (210) of the digital marker. In FIG. 3C, the tip (204) of the digital marker is shown as being thinner and sharper in comparison with the tip of FIGS. 3A-3B. Those of ordinary skill in the art will appreciate that the tip (204) of the digital marker is a hardware component that may be interchangeable and designed to mimic a pencil, pen, marker, stylus, or any other suitable writing tool having varying widths and sharpness. In FIG. 3C, the button is not shown.

While FIG. 3A-3C show a cylinder shape for the digital marker, those skilled in the art will appreciate that the shape of the digital markers may take other forms without departing from the scope of the invention.

As described above, users of the e-flipchart are able to create, display, store, modify, and share e-presentations. Each e-presentation includes one or more pages organized in a sequential manner. The controller includes functionality to store the information necessary to maintain the e-presentation and allow the user to interact with the e-presentation as described below. An exemplary e-presentation is shown in FIG. 4.

Figure 4:
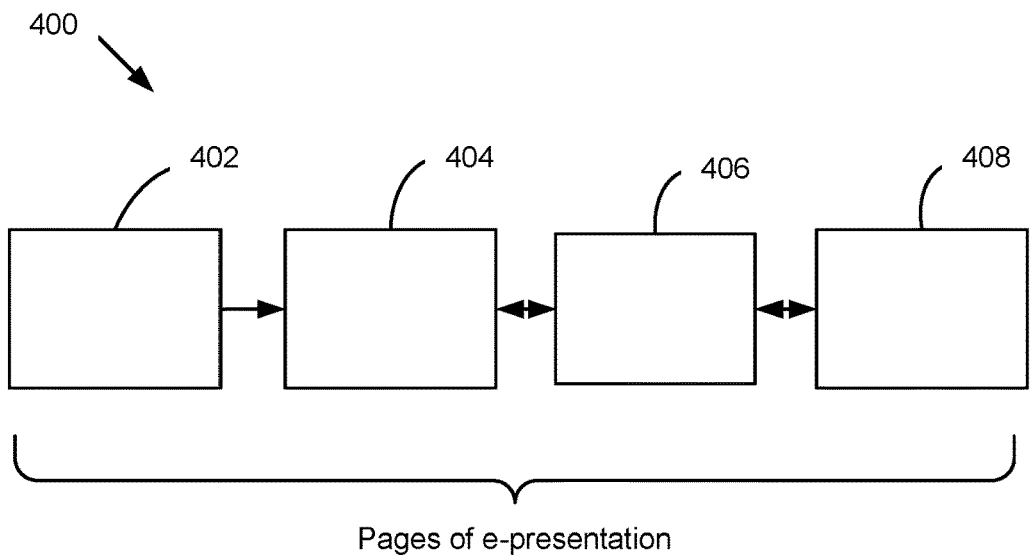
FIG. 4 shows a data structure for an electronic flipchart in accordance with one or more embodiments.

FIG. 4 shows an e-presentation (400) in accordance with one or more embodiments of the invention. The e-presentation may include one or more pages (402, 404, 406 408), where each page represents an electronic page of the e-flipchart. Each page of the e-presentation (400) corresponds to content that may be displayed on the e-flipchart apparatus. In one or more embodiments of the invention, the e-presentation (400) shown in FIG. 4 may be stored in memory or persistent storage associated with the e-flipchart apparatus or in a cloud computing environment to which the e-presentation is backed-up, or any combination thereof. For example, the e-presentation may be stored in persistent storage locally, and mirrored in the cloud environment.

In one or more embodiments of the invention, the e-pages (402, 404, 406, 408) are linked as the e-presentation is populated, in real-time. The link between the pages is represented by the bi-directional arrows shown in FIG. 4. Specifically, the link between pages of the e-presentation and the metadata stored to track the various information associated with the e-presentation is shown in FIG. 5.

Figure 5:
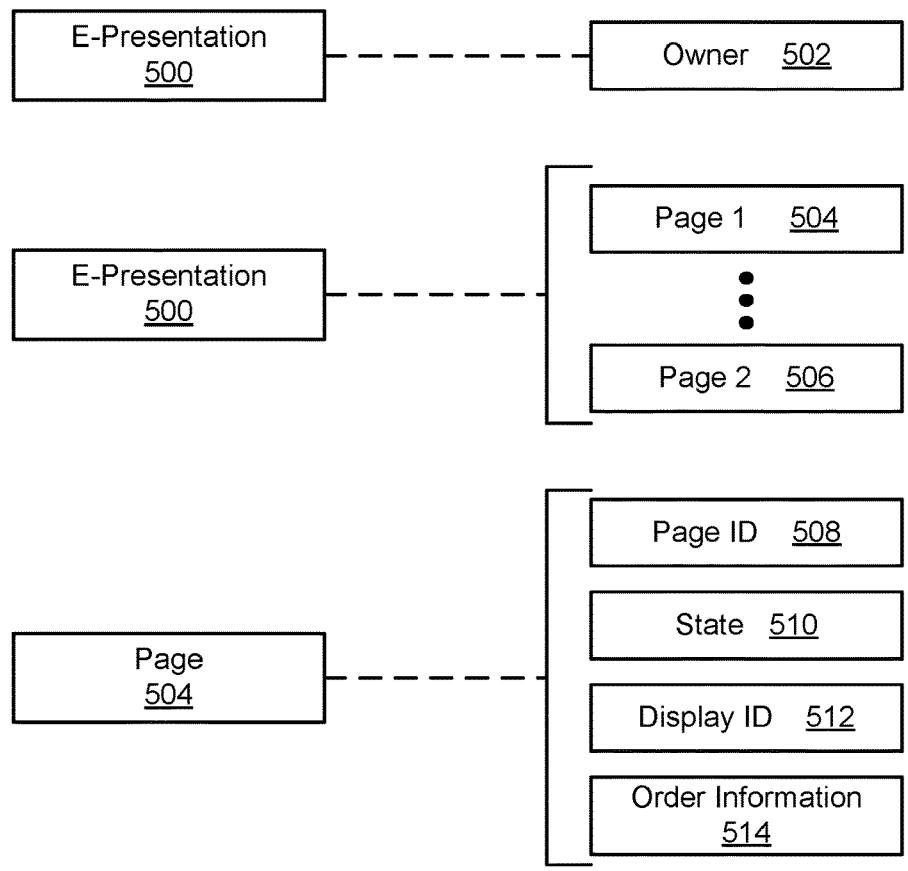
FIG. 5 shows data relationships for an electronic flipchart in accordance with one or more embodiments.

Specifically, in FIG. 5, each e-presentation (500) may be associated with an optional owner (502). In one or more embodiments of the invention, the owner (502) may be the entity or device on which the e-presentation is initially created. In this case, the owner (502) may be represented by a device ID which identifies the device on which the e-presentation is created. For example, when the e-presentation (500) is created on the e-flipchart apparatus, the owner (502) field may be populated with the local ID of the e-flipchart. Alternatively, the owner (502) may be an individual or group of individuals. In this case, the owner (502) may be represented by one or more user IDs. In one or more embodiments, although not shown, an e-presentation may also have permissions associated with the presentation as a whole, or each page of the e-presentation. Specifically, permissions to read/view/edit an e-presentation may be given by the owner (502) of the e-presentation (500), or by a user of the e-flipchart or other device that is specified as the owner of the e-presentation.

In addition, as shown in FIG. 4 above, the e-presentation (500) may be composed of one or more pages (e.g., Page 1 (504), Page N (506)). Each page (504, 506) is in turn associated with content (data) and metadata. For example, as shown in FIG. 5, page (504) has a page ID (508), a state (510), a display ID (512), and order information (514). The page ID (508) uniquely identifies that page in the e-presentation. The page ID (508) may be numerical, alphabetical, symbolic, or any combination thereof. In one embodiment of the invention, each page may be associated with a state (510). In such embodiments, the state (510) of the page (504) may be, but is not limited to, an active or an inactive state. An active state indicates that page (504) is currently displayed or being written to via the e-flipchart or via another device (see e.g., FIG. 10). An inactive state indicates that page (504) is part of the e-presentation but is not the page that is currently displayed (i.e., the page is not shown) or being written to. Those skilled in the art will appreciate that a page may be associated with other states without departing from the scope of the invention, such as for example, an edit state in which the page is being edited offline, or an offline state in which the page is linked to the e-presentation but is offline or stored in persistent memory.

In one embodiment of the invention, each page may be associated with a display ID (512). In such embodiments, the display ID (512) associates the page (504) with a display device. For example, in a scenario in which the page (504) is displayed on the e-flipchart, the display ID may be the ID of the e-flipchart. In an alternate embodiment, suppose page (504) is linked to an e-presentation currently being modified on the e-flipchart, but is not the active page of the e-presentation. In this case, the page (504) may be shared with second device over a network, so that the owner of the second device may edit the page (504) (see e.g., FIGS. 9A-9C, 10). In this scenario, the display ID (512) associated with the page (504) is the ID of the second device on which the page (504) is being edited. Accordingly, the display ID (512) of a page (504) linked to an e-presentation may change at any time. In one or more embodiments, there may be multiple display IDs (512), each one corresponding to a device that is currently viewing the page (504). Further, in one or more embodiments, the display ID may only be assigned when the state of a page is active. When the state of page is inactive, the display ID field in the data structure of the e-presentation may be null.

In one or more embodiments of the invention, the order information (514) of a page (504) links the page (504) to other pages in the e-presentation in a specific order and indicates how the pages of an e-presentation may be traversed. Specifically, the e-flipchart apparatus mimics use of a typical paper flipchart apparatus, in which a new page is obtained by flipping a current page over the flipchart apparatus. In the typical flipchart apparatus, the pages are flipped in an order, such that pages cannot be skipped to obtain a particular page of the e-presentation. Similarly, with the e-flipchart apparatus, each page (504) of the e-presentation may be linked to at least one page prior to the page (504) and at least one page following the page (504) in the e-presentation. In one or more embodiments of the invention, the order information (514) may include the page IDs of at least the page prior to the page (504) and the page following the page (504). Those skilled in the art will appreciate that the controller may facilitate skipping to a page out of order without departing from the scope of the invention.

In one or more embodiments of the invention, the metadata associated with an e-presentation, as shown in FIG. 5, may be populated and stored into a data structure as the e-presentation is created and modified. The data structure may then be stored locally in the e-flipchart apparatus persistent storage, or in a cloud computing environment. A specific example of how the data structure is populated is described in FIG. 8 below.

FIG. 6 shows a flow chart in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 602, the e-flipchart apparatus is in display ready-mode. As described above, the e-flipchart apparatus may be always "on," and therefore, ready for use when a user walks up to the apparatus or provides another type of input that is detected by the apparatus (Step 604). Specifically, in the ready-mode (or base state), the e-flipchart apparatus polls for an input at a low frequency or input scan rate. In this mode, the display area of the e-flipchart apparatus may include the image from the last time it was fully active. When an input is detected, the apparatus changes state from ready-mode to the active state. For example, in one or more embodiments of the invention, when input is sensed by the electromagnetic board, a signal is sent to a controller CPU which is running the energy management software to "wake up" some or all the components and put them in "active mode". The same process occurs when a signal is detected via a GUI, touch input, or in a "wake up on LAN" input.

The input detected by the e-flipchart apparatus in Step 604 may be a wireless input provided by the press of a button, such as a Bluetooth signal, radio frequency signal, or other wireless network signal, a digital marker input, a touch input, a gesture input, or any other suitable type of input. Based on the type of input detected, a specific action may be performed by the e-flipchart apparatus. Thus, upon detection of an input, a determination is made as to whether the input is a touch input or a gesture input (Step 606). If the detected input is a user gesture, the e-flipchart apparatus may be configured to perform gesture detection or activate a user interface (UI) component (Step 608). For all other input types, an appropriate action is performed by the e-flipchart apparatus (Step 610). For example, when the detected input is not a touch or gesture input, but rather, is a wireless signal, for example, a press of the button on the digital marker, corresponding external events may be activated (Step 610). For example, in Step 610, when the input is a Bluetooth signal, the e-flipchart apparatus may be configured to activate a peripheral device or external Bluetooth receiver. External event inputs may also be, in one or more embodiments of the invention, proximity sensors, motion sensors, sound sensors that detect sound above a particular decibel threshold, etc., for detecting the presence of one or more people close to or in the vicinity of the e-flipchart apparatus. For example, proximity sensors may include ultrasonic sensors or infrared sensors. In yet another embodiment of the invention, when the detected input is a pen stroke using a digital marker or digitizer, the e-flipchart apparatus may be configured to detect the path of the digital marker tip and convert the motion to a display of simulated ink strokes (Step 612). Accordingly, the specific action performed by the e-flipchart may vary depending on the type of input received.

When the detection input is a gesture or a touch input, the activated components may display data on the display area, flip a page, zoom into the content displayed, or perform any other suitable action in response to the touch/gesture input. In one or more embodiments of the invention, after performing the action in response to the detection of an input, the e-flipchart apparatus returns to the base state of "ready-mode." In one or more embodiments, in this mode the e-flipchart apparatus to continue to display an image without any power used by the bi-stable reflective display component of the apparatus. Examples of the types of actions that may be performed are described below in FIGS. 7A-7E.

Specifically, in one or more embodiments of the invention, FIG. 7A shows an example front frame (102) of an e-flipchart apparatus. The front frame (102) mimics a screen and has an area which is capable of accepting at least two type of input: touch and digital marker. When one of the aforementioned types of input is detected, for example in the active region or display area of the layer having at least one touch portion (104), an e-presentation (700) is created and displayed. Specifically, when a user walks up to the e-flipchart apparatus in ready-mode and provides an input, the e-presentation (700) is created. Creation of the e-presentation may include generating and populating the data and metadata shown in FIG. 5. In FIG. 7A, the display area is blank. In FIG. 7B, an example input of writing (702) using a digital marker (210) on the active area of the e-flipchart apparatus is shown. Specifically, in FIG. 7B, when the tip of the digital marker or digitizer (210) is pressed onto the active area of the e-flipchart apparatus, the path of the digital marker (210) is detected and converted by the software of the e-flipchart apparatus into simulated ink strokes (702) which are displayed on a first page of the e-presentation (700). FIG. 7C shows at least one embodiment in which the displayed stroke images are maintained on the e-flipchart apparatus without any power consumption by the reflective display component of the e-flipchart apparatus. In one or more embodiments of the invention, the reflective display displays the latest information that resulted from input to the e-flipchart, and does not change until new input is received by the controller.

Figure 7E:
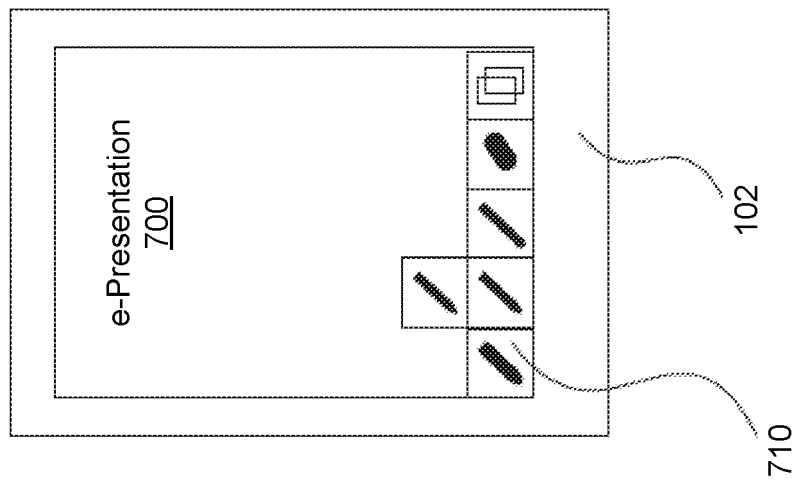
Figure 7D:
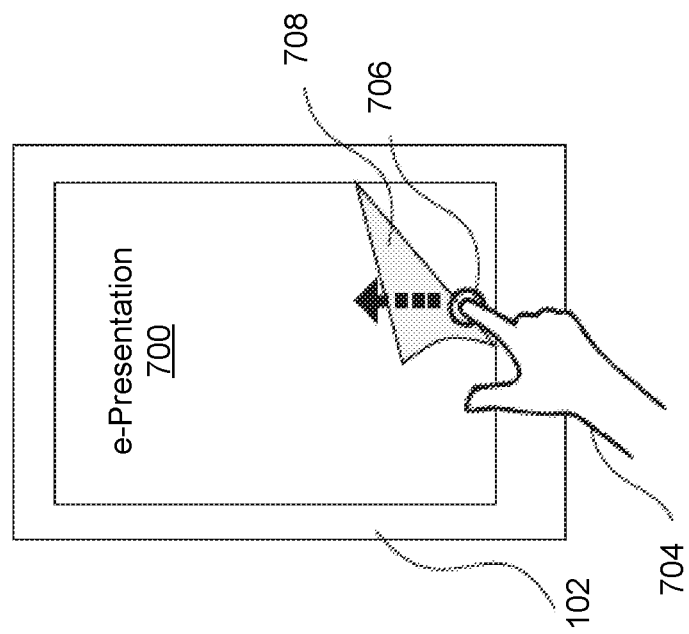

In FIG. 7D, a touch input (704) is detected by the e-flipchart apparatus. In the example shown, a user touches the display screen (706) and, in one or more embodiments, moves his/her finger in an upward motion (indicated by the arrow pointed upward), resulting in the current page (708) flipping over to begin a new page of the e-presentation (700). Those skilled in the art will appreciate that a page may be flipped using a gesture input as well, in addition to or instead of a touch display as shown in the example of FIG. 7D. For example, a visual gesture (e.g., movement of a hand in a particular path without touching the e-flipchart) which may be detected by the camera and that is interpreted as a page flip may result in the software interpreting the flip gesture as a page flip action. A page flip action results in transitioning from a current page to another page of the e-presentation. In FIG. 7E, a graphical user interface (GUI) (710) is displayed on the screen of the e-flipchart apparatus. The GUI (710) may be invoked by the pressing of a button on the digital marker, by a gesture, or by any other designated input. In one or more embodiments of the invention, the GUI (710) may be invoked from a menu on a secondary screen that is, for example, connected to a cloud server by a bi-directional communication channel. In one or more embodiments, the GUI (710) may be used to select particular features or perform selected actions such as, for example, sharing the current page of an e-presentation, selecting an eraser, changing the font, style, or color of the displayed line strokes, etc.

Figure 7F:
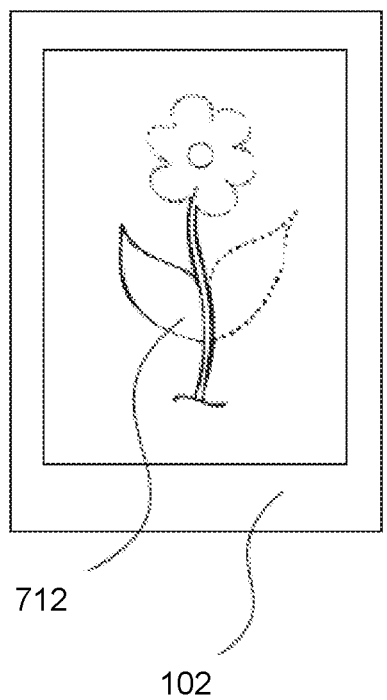

FIG. 7F shows an example of an e-presentation having a drawing. In one or more embodiments of the invention, as shown in FIG. 7F, the e-flipchart apparatus may display a pencil skeleton image (712) to aid a user in creating an e-presentation. The pencil skeleton may provide a light image so that a user may, at a later time, trace the light pencil drawing with a marker to draw a predetermined object. This feature may be used, for example, to create an illusion that the user is creating artwork on the fly. Although FIG. 7F shows a pencil skeleton of a flower, those of ordinary skill would appreciate that the pencil skeleton may depict any object, or may more generally provide any type of aid for writing or drawing. For example, the pencil skeleton may be a combination of light horizontal and vertical lines mimicking graph paper or notebook paper.

Figure 8:
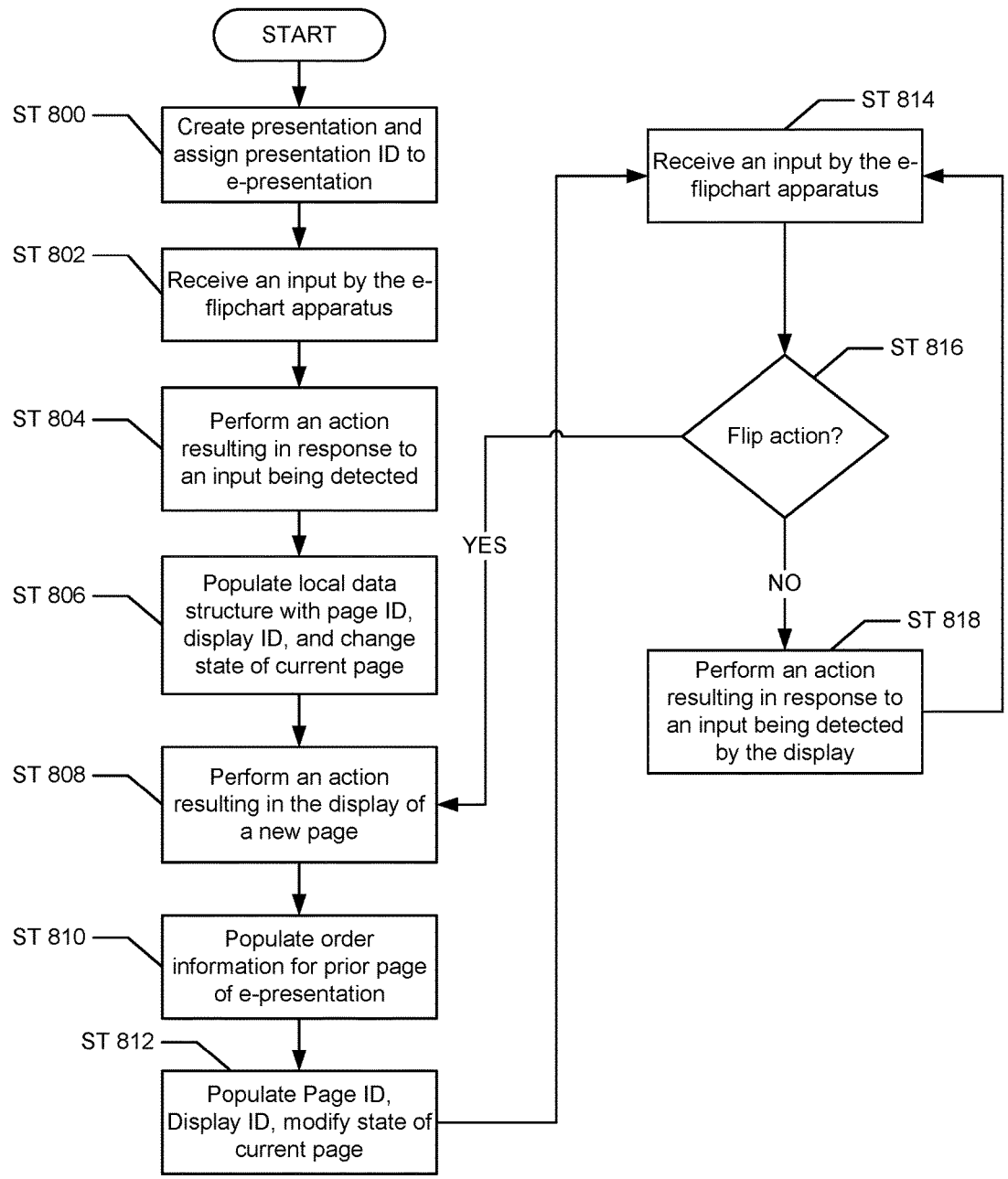
FIG. 8 shows a flowchart in accordance with one or more embodiments.

FIG. 8 shows a flow chart in accordance with one or more embodiments of the invention. Specifically, FIG. 8 shows a flowchart for creating and maintaining an e-presentation in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In step 800, an e-presentation is created and associated with a presentation ID. In one or more embodiments of the invention, the presentation ID may be assigned by an e-presentation server, or alternatively, may be generated by the e-flipchart or provided in response to an input prompt to the user. The e-presentation server may be a remote server that is connected to the e-flipchart apparatus via a network. The functionality and purpose of the e-presentation server is described below in FIG. 10. The presentation ID may be a numerical ID, alphabetical ID, a symbolic ID, or any combination thereof, and is configured to uniquely identify the e-presentation displayed on the e-flipchart apparatus. When an e-presentation is initially created, it may not contain any content. Further, if the e-flipchart apparatus does not receive any user input within a certain period of time, the e-flipchart apparatus may transition to ready-mode. In one embodiment of the invention, step 800 may be performed when the e-flipchart apparatus is in either ready mode or active mode.

In Step 802, an input is detected by the e-flipchart apparatus in ready-mode. In ready-mode, the apparatus is scanning for input at a low frequency, e.g., twice per second. As described above, the input detected by the reflective display may be a touch input, a digital marker input, a proximity sensor input (e.g., when a user approaches the e-flipchart apparatus), a network signal, or any other suitable type of input. As described above, when an input is detected, the apparatus changes state from ready-mode to the active state. For example, in one or more embodiments of the invention, when input is sensed by the electromagnetic board, a signal is sent to the controller CPU which is running the energy management software to "wake up" some or all the components and put them in "active mode". The same process occurs when a signal is detected via a GUI, touch input, or in a "wake up on LAN" input. Step 802 may also be performed when the e-flipchart apparatus is in active mode.

In step 804, an action is performed in response to the received input. For example, the corresponding action may be to activate one or more components of the e-flipchart apparatus, convert input strokes to display rendered stroke images, display a GUI, share information with another device, etc. In one or more embodiments of the invention, when the input is received via a digital marker on the surface of the apparatus, the apparatus may identify a tip width of the digital marker via various methods. For example, the electromagnetic board may detect the tip width of the digital marker. Alternatively, the layer having at least one touch portion may be configured to detect the tip width of the digital marker. In yet another embodiment, the digital marker may transmit a signal to the apparatus that includes information about the tip width. In one or more embodiments of the invention, using information about the tip width associated with the input received, the apparatus may be configured to display a certain line width for rendered strokes.

In Step 806, a data structure (shown in FIG. 5, for example) for storing metadata associated with the e-presentation is populated with a page ID and a display ID. In addition, the state of the current page with the page ID is changed to active. In one or more embodiments of the invention, the data structure may be populated and stored locally, in the memory associated with the e-flipchart apparatus, or may be stored remotely, for example, in an e-presentation server or cloud computing environment. If the data structure is stored locally, the data structure may be backed-up (e.g., mirrored) on a remote server or in the cloud computing environment. At this stage, various actions may be performed resulting in writing or drawing on the current page. In step 808 an input resulting in display of a new page may be detected. For example, a touch input or gesture which results in a page flip.

In step 810, when a second page is created as part of the e-presentation, the data structure is populated with order information, linking the first page to the new second page in the e-presentation. In step 812, the new page of the e-presentation may be assigned its own page ID, following that of the first page ID, and display ID. In addition, the state of the first page is changed to inactive, and the state of the current page, i.e., the second page, is changed to active. In step 814, input is received by the e-flipchart apparatus.

In step 816, a determination is made as to whether the input received in Step 814 is a page flip action. If a page flip action is detected, the method proceeds to Step 808 and the data structure continues to populate itself with a third page ID and ordering information for the second page is updated to reflect the link to the third page. This process may repeat each time a page flip action is detected by the e-flipchart apparatus. Alternatively, if no page flip action is detected, then the process proceeds to step 818. In step 818, an action corresponding to the input received is performed. In one embodiment of the invention, the process may not end (i.e., various steps in FIG. 8 may be repeated), because the e-flipchart apparatus does not turn "off." Rather, when input is not detected for a predetermined amount of time, the e-flipchart apparatus returns to "ready-mode" and waits for an input (Step 814).

Figure 9C:
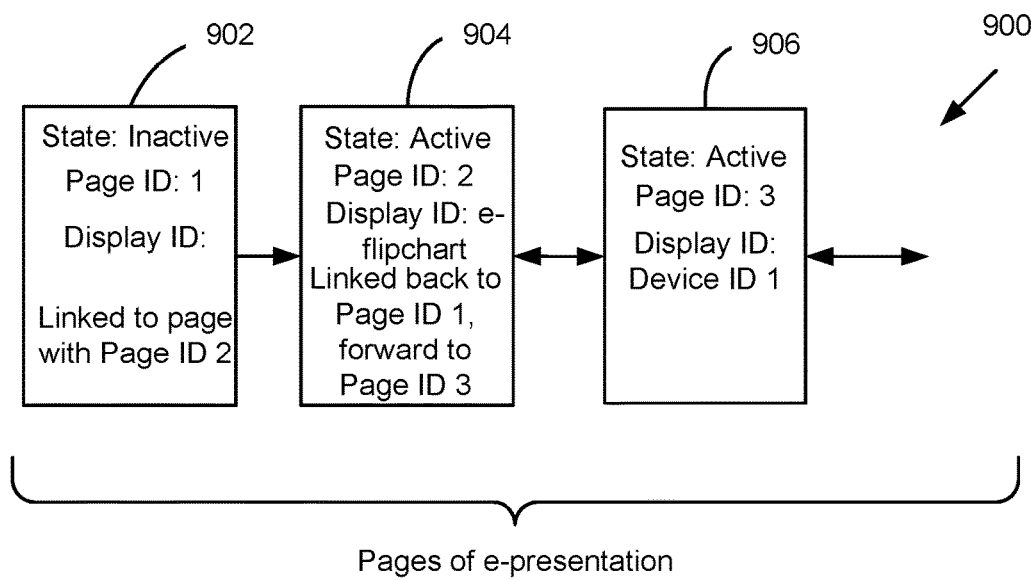

FIGS. 9A-9E show examples of the method described in FIG. 8 above in accordance with one or more embodiments of the invention. In FIG. 9A, consider a scenario in which an e-presentation is created by the e-flipchart apparatus. At some point after the e-presentation is created, assume that a user walks up to the e-flipchart apparatus and provides an input in the form of pressing a button on or writing with a digital marker. Once the input is detected, the action associated with the input is interpreted and, in this example, result in content being associated with the first page (902) of the e-presentation. The first page (902) (i.e., the page on which characters are written, for example) is displayed on the active area of the e-flipchart apparatus with a white background. At this stage, the data structure (900) which stores metadata associated with the e-presentation begins to be populated with metadata. As shown in FIG. 9A, the metadata associated with page 1 (902) includes the state of active, a page ID of 1, and a display ID that identifies the e-flipchart apparatus. The owner ID of the e-presentation may also be the ID of the e-flipchart apparatus, or may be null for purposes of this example. Those skilled in the art will appreciate that no order information exists for a single page e-presentation.

Now suppose the user gestures or provides a touch input which the software of the e-flipchart apparatus interprets as a page flip action. As shown in FIG. 9B, a second page is added to the e-presentation, and the metadata for both page 1 (902) and page 2 (904) is updated/populated in the data structure (900). Specifically, the state of page 1 (902) becomes inactive as it is no longer the page that is displayed. Further, the display ID field of page 1 (902) is updated to null. Order information is added to page 1 (902) linking the page to the second page (904) in order. For page 2 (904), an active state is retained, a new page ID is assigned and the display ID is updated to be the ID of the e-flipchart apparatus. Order information for page 2 (904) is populated to reflect that page 2 (904) is linked to page 1 (902). More specifically, page 2 (904) comes after page 1 (904). The order information becomes important when a page flip action is performed. Specifically, during normal operation, because the e-flipchart apparatus mimics a traditional paper flipchart, pages must be flipped in order (i.e., when using the page flip action, one cannot jump from page 1 to page 4, for example, without also flipping pages 2 and 3, although pages may be flipped in groups).

Continuation with the example, FIG. 9C depicts the metadata associated with an e-presentation that is shared with other owners/devices in order to collaborate on the e-presentation. In FIG. 9C, a third page (906) is added to the e-presentation. In this example, the third page is shared directly with another device (Device 1), while the second page (904) is still displayed on the active area of the e-flipchart apparatus. Device 1 (not shown) may be any smart phone, tablet, laptop, or desktop computer, a smart/interactive white board, or any other suitable device capable of displaying content and connecting to the e-flipchart apparatus or the shared e-presentation server (1002). Further, Device 1 may be connected to the e-flipchart apparatus via a point-to-point or a network connection that may be wired or wireless, such as via the Internet, or indirectly connected via a cloud server. Continuing with the data structure (900) content, the first page (902) remains inactive, and the second page (904) is updated to reflect that it is linked to page 1 (902) before and page 3 (906) after. In one or more embodiments of the invention, the state of the third page is also active, because even though it is not displayed on the e-flipchart apparatus, it is being displayed on another device (i.e., Device 1). Accordingly, the Display ID of the third page (906) is Device ID 1, which identifies Device 1.

Those skilled in the art will appreciate that page 3 (906) of the e-presentation as described in FIG. 9C above may be shared locally (i.e., in the same room with others viewing the e-presentation) or remotely (i.e., via a network connection to someone viewing the e-presentation on a remote device). Further, information may be sent and received by Device 1 and the e-flipchart apparatus bi-directionally, either through a server configured to store and manage the entire e-presentation file, or directly. Accordingly, a portion of or the entirety of e-presentations created on the e-flipchart apparatus may be shared and edited by a plurality of devices, all connected to the e-flipchart apparatus or to a shared e-presentation server. This allows for collaboration with audience members who are not physically located in the room where the e-flipchart is located.

Figure 10:
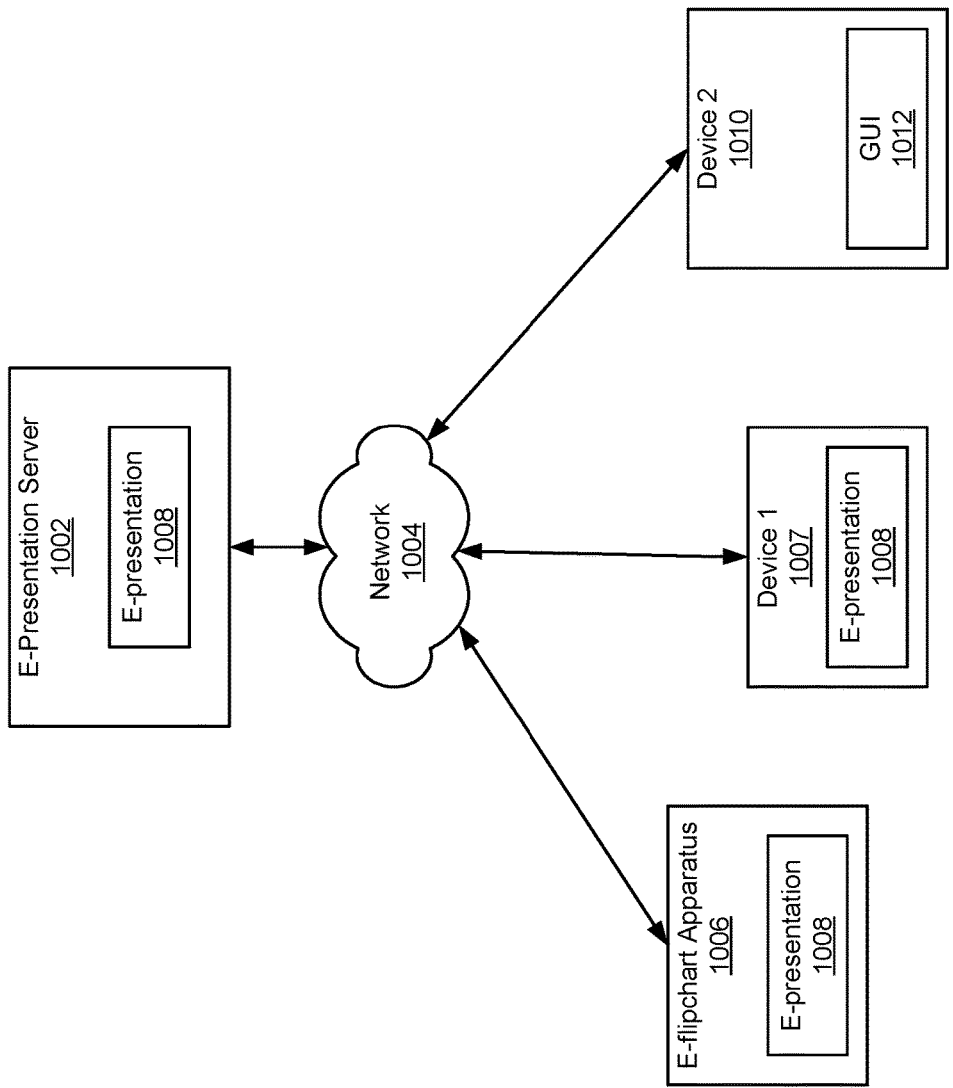
FIG. 10 shows a system for collaboration using an electronic flipchart in accordance with one or more embodiments.

FIG. 10 shows a system for sharing an e-presentation created on an e-flipchart apparatus in accordance with one or more embodiments of the invention. Specifically, FIG. 10 shows an e-presentation server (1002) connected via a network (1004) to the e-flipchart apparatus (1006) on which an e-presentation (1008) is created. In one or more embodiments of the invention, the e-presentation server (1002) may be a remote server configured to store and manage the e-presentation as a shared file. For example, the e-presentation server may be a cloud computing server or any other suitable type of server. In such cases, as shown in FIG. 10, the e-presentation server includes a copy of the e-presentation (1008). In one or more embodiments of the invention, the e-presentation server (1002) is configured to assign an e-presentation ID to an e-presentation when it is created or displayed on the e-flipchart apparatus display (1006). All the pages of an e-presentation are then associated with this e-presentation ID. In addition, the e-presentation server (1002) is configured to enforce the permissions of the e-presentation and may maintain and/or back-up the data structure (see e.g., FIG. 5) that is created for each e-presentation. The e-presentation server (1002) may also be configured to synchronize a shared e-presentation based on multiple contemporaneous inputs from other devices (e.g. 1007) connected to the same e-presentation.

In one embodiment of the invention, if multiple devices are concurrently editing an e-presentation, then when a specific device makes a change to the e-presentation, the device sends an incremental update to the e-presentation server (1002). In response to receiving the update, the e-presentation server updates its copy of the e-presentation and then sends the incremental update to all other devices (except the device that sent incremental update).

Continuing with the discussion of FIG. 10, the network (1004) may be any wired or wireless network configured to facilitate bi-directional communication between the e-presentation server (1002) and the e-flipchart apparatus and directly between device 1 (1007) and device 2 (1010). As described above, the network (1004) may be the Internet or any other suitable network. Device 1 (1007) and Device 2 (1010) may be local devices in the same room as the e-flipchart apparatus, or remote devices all connected to the e-flipchart apparatus via the e-presentation server (1002). Device 1 (1007) and Device 2 (1010) may be tablets, smart phones, laptops, desktop PCs, a wearable device, such as a an interactive watch or bracelet, or any other suitable device. Alternatively, one or more of Device 1 (1007) and Device 2 (1010) may be additional e-flipcharts. The system of FIG. 10 allows users to see and collaborate on e-presentations that may be updated by a remotely connected device in real-time. The following example illustrates this concept using the components of FIG. 10.

Suppose that Device 1 (1007) is in the same physical location as the e-flipchart (1006) and Device 2 (1010) is a remote device. A presenter/user of the e-flipchart apparatus (1006) may, while editing or showing the e-presentation, invite audience members to collaborate and provide input in the form of writing or drawing into the e-presentation that has been created and is being presented on the e-flipchart apparatus. In this case, the presenter/user may provide an input that results in Device 2 (1010) being granted permission to edit the e-presentation. In such scenarios, Device 2 (1010) may connect to the e-presentation server via the network (1004), download the e-presentation, and then edit the e-presentation concurrently with Device 1 (1008) and e-flipchart apparatus (1006). When Device 2 (1010) is finished editing, the e-presentation server may delete the Device 2 Display ID. Multiple pages of the e-presentation may be shared individually, or the entirety of the e-presentation may be shared using the system of FIG. 10. Further, multiple pages of an e-flipchart apparatus may be edited in parallel, and the e-presentation server may be configured to synchronize the e-presentation when editing is completed.

In an alternative embodiment, Device 2 (1010) may display a GUI (1012) on its screen with various buttons for different functions, one of them being a button with a page flip function. Using the GUI, Device 2 (1010) may manipulate what is being displayed on the active area on the e-flipchart apparatus, without having actual editing capability. In order for Device 2 (1010) to manipulate the content displayed on the e-flipchart, Device 2 (1010) must be connected to the e-flipchart apparatus (1006) or to the e-presentation server (1002). The connection may be wireless or wired. In this scenario, the owner of the e-presentation may provide Device 2 (1010) with the GUI by providing an input that allows Device 2 viewing permissions, but not editing permissions.

Those skilled in the art will appreciate that the e-flipchart apparatus may be used in any suitable environment, for example, where traditional paper flipcharts would conventionally be useful. For example, the e-flipchart apparatus may be used in conference rooms, classrooms, boardrooms, or any other suitable environment. In one or more embodiments of the invention, the e-flipchart apparatus is designed to connect to the outside world using digital technology such as network connections, and to keep a written record of what was written on the apparatus. In addition, with the e-flipchart apparatus of the present invention, the ability to create and store a presentation before it is presented before an audience on the e-flipchart apparatus is available. For example, the e-flipchart apparatus may have removable memory on which a presentation may already be created and stored, and when the removable memory is installed into the e-flipchart apparatus, the pre-created e-presentation may be shown on the reflective display. E-presentations created using the e-flipchart apparatus may be stored, copied, shared, revised, transferred, and managed using the information described above. Moreover, because the e-flipchart apparatus uses a reflective display, it mimics the look and feel of traditional paper flipcharts.

FIGS. 11-14 show flowcharts in accordance with one or more embodiments of the invention. More specifically, FIGS. 11-14 describe methods for using the interactive device and the removable media device in accordance with one or more embodiments of the invention. While the various steps in each flowchart are presented and described sequentially, one of ordinary skill in the art will appreciate that some or all of the steps may be executed in different orders, may be combined or omitted, and/or may be executed in parallel. In one embodiment of the invention, one or more steps shown in FIGS. 11-14 may be performed in parallel with one or more other steps shown in FIGS. 11-14. Furthermore, the steps may be performed actively or passively. For example, some steps may be performed using polling or be interrupt driven in accordance with one or more embodiments of the invention.

FIG. 11 shows a flowchart for initializing the removable media device by an initialization device (not shown), in accordance with one or more embodiments of the invention. This initialization process may be required to be performed prior to performing the steps in FIGS. 12-14 The steps shown in FIG. 10 may be performed by the initialization device, which may be any device that is capable of executing configuration software as exemplified in FIG. 11. For example, the initialization device may be a computing system that is different from the interactive device (103), or it may the interactive device (103).

Continuing with the discussion of FIG. 11, in step 1102, the initialization device executes the configuration software in order to configure the removable media device. The configuration software may be downloaded locally onto the initialization device or it may be executed from a remote server. In step 1104, the initialization device detects the presence of the removable media device connected to the removable media port of the initialization device. This detection may be automatic or it may be based on input received by the initialization device, for example, from a user of the removable media device. In step 1106, the configuration device obtains the serial number of the identification device. The serial number may be directly input into the configuration software or it may be automatically obtained by the configuration software using detection software. Upon receipt of the serial number, the configuration software associates the removable media device with the serial number of the identification device, to facilitate the subsequent authentication of the removable media device.

In step 1108, the configuration device obtains the user login credentials. This information may be manually input into the configuration software or it may be automatically uploaded and extracted from other programs or files, such as an active directory database file. Upon receipt of the user login credentials, the configuration software associates the user of the removable media device with the removable media device.

In step 1110, the configuration device receives the default insertion and the default removal actions of the removable media device. As previously noted, the default insertion action may be an instruction(s) to be performed by the interactive device, upon detecting the insertion of and after the authentication of, the removable media device. Additionally, as previously noted, the default removal action may be an instruction(s) to perform upon the detection of the removal of the removable media device by the interactive device.

In one embodiment of the invention, there may be multiple default insertion and/or removal actions. In such cases, each default insertion action and/or removal action may be associated with a set of conditions that must be satisfied in order for the specific default insertion action and/or default removal action to be performed.

Continuing with the discussion of FIG. 11, in step 1112, the initialization device creates an identification file and stores it on the removable media device. The identification file includes, at least in part, the serial number of the identification device, user login credentials, and the default insertion and removal actions. Those skilled in the art will appreciate that the identification file may not include the default insert and/or removal actions.

Figure 12:
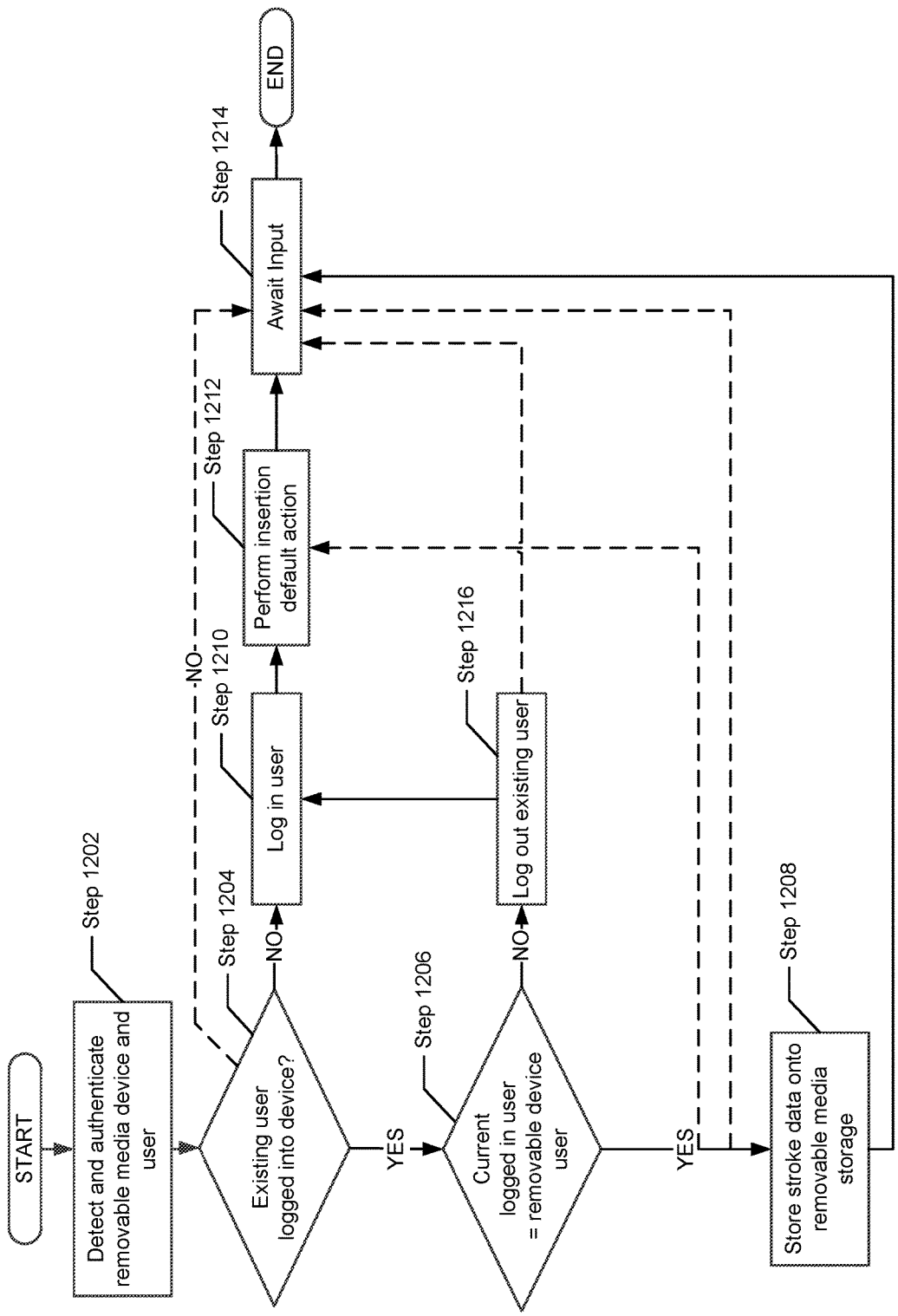
FIG. 12 shows a flowchart for authenticating and creating a session in accordance with one or more embodiments of the invention.

FIG. 12 shows a flowchart for authenticating and creating a session, in accordance with one or more embodiments of the invention.

In step 1202, the interactive device detects and authenticates the removable media device. In one embodiment of the invention, the interactive device authenticates the removable media device by comparing the serial number of the identification device to the optionally encrypted or hashed identification device ID stored in the ID file, upon detecting the connection of the removable media device. In one embodiment of the invention, the serial number is transmitted from the identification device through a channel or communications medium other than the one used to connect the removable media device to the interactive device. In doing so, the system allows for the authentication of the removable media device before the removable media device is accessed by the interactive device.

Alternatively, the removable media device may be authenticated without the use of a separate identification device. For example, the interactive device may authenticate the removable media device by comparing a hash of the identification device ID, located within the removable media device, to the optionally encrypted identification device ID included within the ID file. In this example, the hash of the identification may be located at a location other than the ID file.

In another embodiment of the invention, the removable media device may be authenticated as follows: (i) obtaining a value (e.g., a serial number, a device ID, etc.) from an identification device (described above); (ii) applying a function (e.g., a hash function or an encryption function) to the value obtained in (i) to generate an identification device ID; (iii) obtaining an identification device ID from the removable media device; and (iv) comparing the identification device ID generated in (ii) to the identification device ID obtained in (iii) to determine whether they match. If there is a match, then the removable media device is authenticated.

In another embodiment of the invention, the removable media device may be authenticated as follows: (i) obtaining an identification device ID from an identification device (described above); (ii) obtaining an identification device ID from the ID file; and (iii) comparing the identification device ID obtained in (i) to the identification device ID obtained in (ii) to determine whether they match. If there is a match, then the removable media device is authenticated.

In one embodiment of the invention, step 1202 may also include authentication of the user. For example, the interactive device may prompt the user for credentials (e.g., username and password). Upon receipt of such credentials, the interactive device may compare the credentials (or a hash of the credentials) provided by the user to the user login credentials (or a hash of the user login credentials) in the ID file. Those skilled in the art will appreciate that any mechanism may be used to compare the received credentials with the credentials in the user login credentials file without departing from the scope of the invention.

In another embodiment of the invention, the user login credentials (or a hash of the credentials) may be obtained from the ID file and then provided to an external server (e.g., the e-presentation server in FIG. 11). The external server may subsequently authenticate the user. In such cases, the external server may: (i) authenticate the user and (ii) confirm, using any information that uniquely identifies the removable media device (e.g., an removable media device ID), that the removable media device is still a valid device for the user to use. For example, consider a scenario in which a user (user 1) pre-configures two removable media devices (RMD 1, RMD 2). Accordingly, in this example, both RMD 1 and RMD 2 include its own ID file. Further, an external server that is used to authenticate the user and the removable media devices includes a mapping between the user and RMD 1 and RMD 2. At some point in time, the RMD 1 is stolen by a malicious user. User 1 subsequently initiates the removal of the mapping of user 1 to RMD 1 in the external server. If the malicious user subsequently attempts to access the content on RMD 1, the malicious user will be denied access. Specifically, while the malicious user may use user 1's credentials for authentication and information on the removable media device to authenticate the removable media device, because the mapping between user 1 and RMD 1 has been removed from the external server, access to RMD 1 would ultimately be denied to the malicious user.

Continuing with the discussion of FIG. 12, upon successful authentication, the user may then be permitted to access all or a portion of the interactive device's functionality. For example, the user may be permitted to store (both new and existing sessions), retrieve, and edit data stored on the removable media device.

In one embodiment of the invention, if the user is not authenticated, then the unauthenticated user may only have permission to store new stroke data onto the removable device. In one or more embodiments of the invention, the permissions associated with the user of the removable media may be pre-configured in a way that restricts the use of the removable media device using a combination of methods, such as encrypting the data repository so that it is only accessible after the user of the removable media device has been authenticated by the interactive device either via an existing session or some other mechanism. One of ordinary skill in the art would appreciate that this layered approach to authentication provides both security against unauthorized removable media devices, which are often the source of malware propagations, data theft, and other security breaches, as well as unauthorized users of an authorized removable media device.

Depending on the implementation of the invention, the process may proceed to step 1202 when (i) the removable media device is authenticated; (ii) the user is authenticated; or (iii) when both the removable media device and the user are both authenticated. If none of conditions (i)-(iii) are satisfied, the process may end. Otherwise, the process proceeds to step 1204.

In step 1204, the interactive device determines whether an existing user is currently logged into the interactive device. An existing user is any user that is logged into the interactive device (whether active or idle) at the time the determination is step 1204 is performed. The existing user may have logged in using the method shown in FIG. 12 or may have logged into the interactive device directly (without the use of a removable media device) or through some other mechanism. If there is an existing user logged into the interactive device, the process proceeds to step 1206; otherwise, the process may proceed to step 1210 or to step 1214. The process may proceed to step 1214 in the event that interactive device is used without the user logging into the interactive device. In such cases, the user may be able to access content stored on the removable media device but may not be able to access any other content that is associated with a logged in user (such as cloud storage) and may not be able to access other features of the interactive device that are associated with a logged in user.

In step 1206, the interactive device determines whether the existing user logged into the interactive device is the same user that was authenticated in step 1202. If the existing user logged into the interactive device is the same user that was authenticated in step 1202, then steps 1208, 1212 and/or step 1214 may be performed; otherwise, the process proceeds to step 1216.

In step 1208, the interactive device automatically stores the stroke data of the existing logged in user onto the removable media device. More specifically, when there is no removable media device connected to the interactive device, the stroke data may be stored locally on the interactive device and/or remotely (e.g., in cloud storage, see e.g., FIG. 1A). In such cases, when the removable media device is inserted and both the user and the removable media device are authenticated, then the aforementioned stroke data for the session map be stored in the removable media device. The process may then proceed to step 1214 (or step 1212).

In step 1212, the interactive device may perform the insertion default action stored on the removable media device, which may specify other actions to take, as an alternative of, or in addition to, storing the stroke data onto the removable media device. For example, the default insertion action may specify a different area for storing the stroke data, such as in the cloud storage, or it may instruct the interactive device to create a new session. Additionally, if there is no stroke data present on the interactive device at the time that steps 1208 and 1212 (if applicable) are executed (e.g. because the default insertion action instructed the interactive device to create a new session), then the interactive device proceeds to step 1214, where it awaits stroke input (as described above).

Continuing with the discussion of FIG. 12, referring back to step 1204, if the interactive device determines that an existing user is not currently logged into the interactive device, the process proceeds to step 1210. In step 1210, the user (i.e., the user authenticated in step 1210) is logged into the interactive device. The interactive device then proceeds to steps 1212-1214, as previously described above.

Referring back to step 1206, if a determination is made that the existing user logged into the interactive device is not the same user that was authenticated in step 1202, the process proceeds to step 1216. In step 1216, existing user is logged out of the interactive device, the process may then proceed to step 1210 or step 1214. The stroke data (and other data/information) associated with the logged out user may be stored locally and/or remotely.

Figure 13:
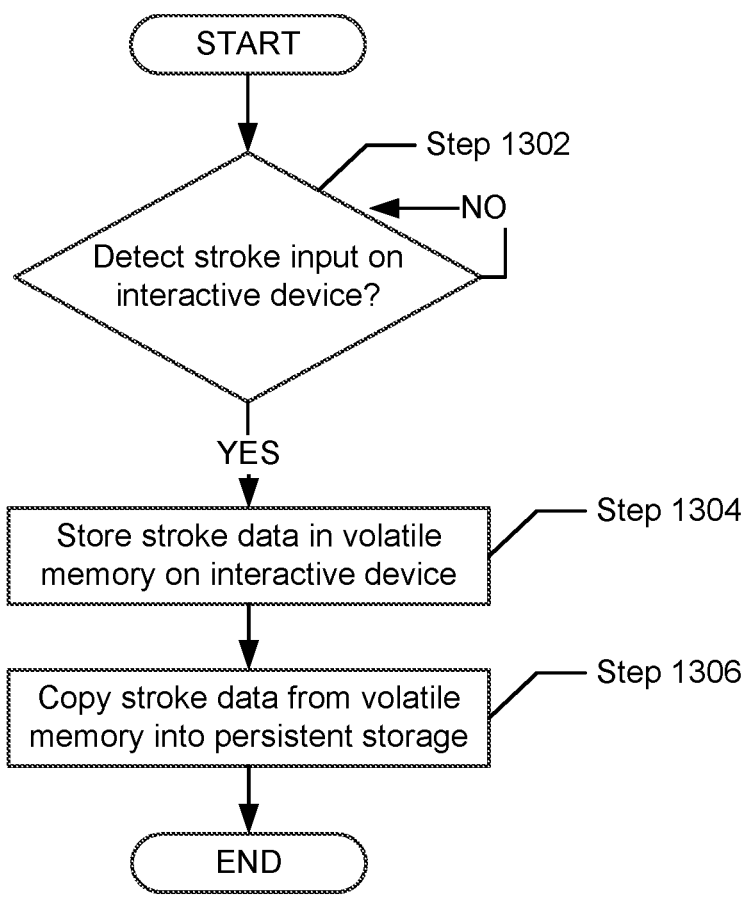
FIG. 13 shows a flowchart for storing stroke data in accordance with one or more embodiments of the invention.

FIG. 13 shows a flowchart for storing stroke data, in accordance with one or more embodiments of the invention.

In step 1302, the interactive device detects whether there is a presence of stroke input on the interactive display. As previously discussed, the stroke input may be a dot, a line, a letter, a drawing, a word, or a series of words made on the interactive display using a digital marker or stylus pen. In step 1304, the interactive device stores the stroke input as stroke data in the volatile memory of the interactive device.

In step 1306, the interactive device copies the stroke data from the volatile memory onto the persistent storage (which may include local persistent storage, cloud storage, or persistent storage on a removable media device). Upon the detection and authentication of the removable media device, the interactive device copies the stroke data from its volatile memory to the data repository of the removable media device. As previously discussed, the stroke data is stored in the removable media device in a database format, for later reference and retrieval.

Referring back to step 1302, if the interactive device does not detect stroke input on the interactive display at a certain point in time, the interactive device enters into a continuous loop, as shown in FIG. 13. Once the loop is entered, the interactive device periodically checks for stroke input until it either detects stroke input, thereby proceeding to steps 1304-1306 as previously described, or the process is discontinued by some other action.

In one embodiment of the invention, the stroke data may be temporarily stored on the volatile memory of the interactive display until a certain amount of stroke data has been received (referred to as aggregated stroke data). Once a certain amount of stroke data has been received, the aggregated stroke data is stored on persistent storage (See e.g., step 1306).

Figure 14:
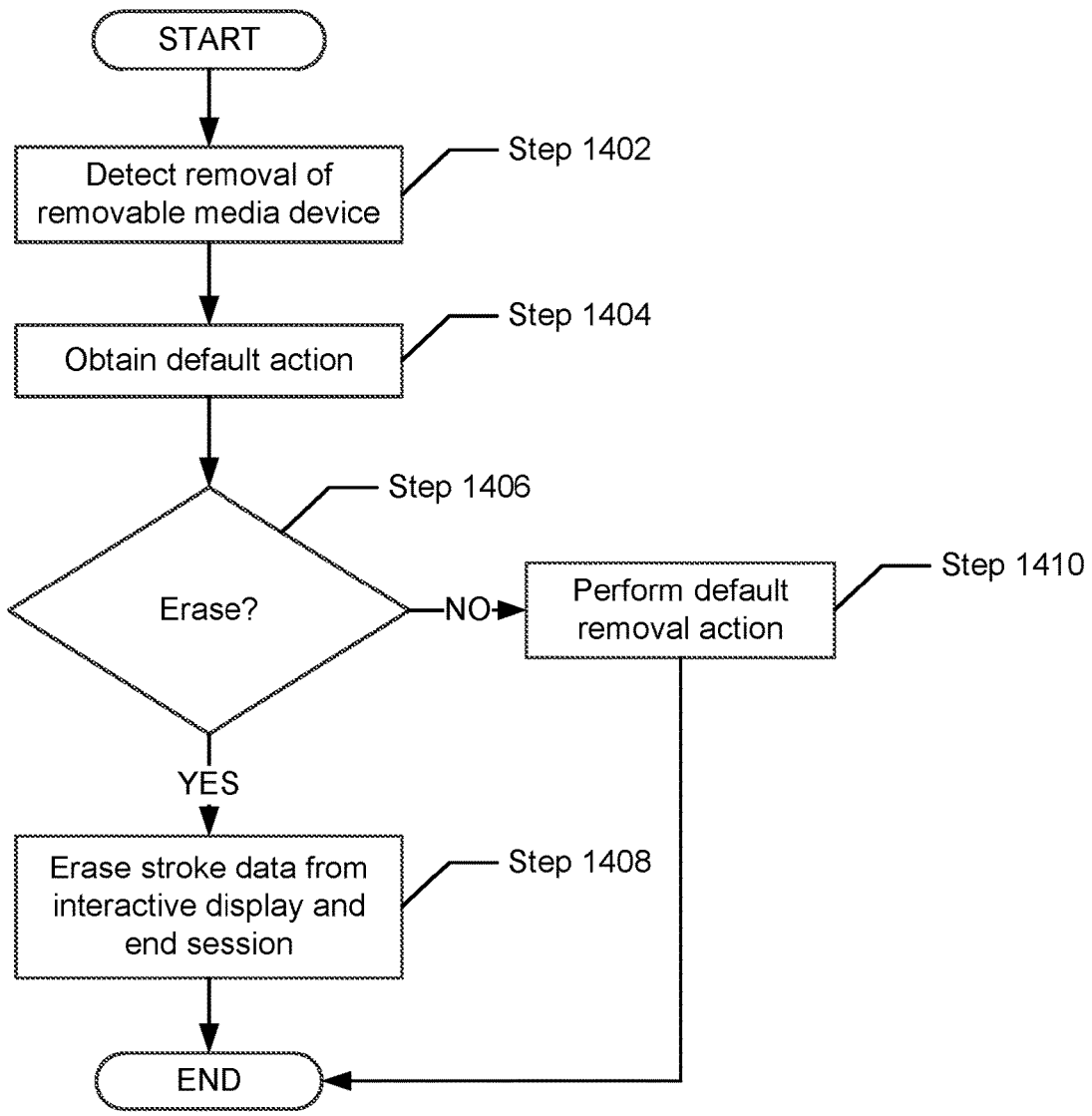
FIG. 14 shows a flowchart for erasing stroke data in accordance with one or more embodiments of the invention.

FIG. 14 shows a flowchart for erasing stroke data in accordance with one or more embodiments of the invention.

In step 1402, the interactive device detects the disconnection of the removable media device. For the purposes of this invention, a removable media device is disconnected from the interactive device when it is no longer operatively connected in a manner that facilitates the execution of certain method steps, such as those embodied in FIGS. 12-13. The disconnection may result from either physical or virtual disturbances. For example, the interactive device may detect the disconnection of the removable media device as the result of a user physically removing the removable media device from the removable media port of the interactive device. As another example, the interactive device may detect the disconnection as a result of an automatic session disconnection due to inactivity on the interactive device after a specified period of time, or as a result of a user unmounting (or otherwise disconnecting) the removable media device from the interactive device via the user interface of the interactive device.

In step 1404, the interactive device obtains the default removal action. As previously mentioned, the default removal action, which is stored within the ID file of the removable media device, may instruct the interactive device on the action(s) to take upon detecting the disconnection or removal of the removable media device. For example, the default removal action may be to erase all traces of the stroke data from all components of the interactive device. As another example, the default removal action may be to store a copy of the stroke data in a specified area of persistent storage, such as the persistent storage of the interactive device, and then erase all traces of the stroke data from all components of the interactive device other than the persistent storage.

In step 1406, the interactive device determines whether to immediately erase the stroke data from the interactive display, based on the presence or absence of the default removal action. If the default removal action was not modified by the user to include additional instructions during the pre-configuration of the removable media device, then the interactive device proceeds to step 1408, erasing the stroke data from the interactive display, as well as any traces of the stroke data from all components of the interactive device. The interactive device may then end that particular removable media device session. In order to re-initiate the use of the removable media device after the session has ended, the removable media device must again undergo the authentication process, as described in FIG. 12. In step 1410, assuming the default removal action was modified by the user during the pre-configuration of the removable media device to include additional instructions, the interactive device may perform the default removal action as specified by the user.

The following example is for explanatory purposes only and not intended to limit the scope of the invention. Consider a scenario in which there exist multiple presenters giving presentations at an annual conference. The presentations are given in a conference room, which is equipped with an interactive device and a virtual marker pen. During past conferences, the coordinator has had to deal with various logistical and security nightmares, as a result of multiple presenters sharing the interactive whiteboard. To remedy some of those issues, the coordinator provided each presenter with their own pre-configured USB device. As a general policy, the coordinator banned the use of all personal USB devices, after experiencing a malware outbreak resulting from an infected USB device. Now the coordinator only allows the presenters to use the USB devices pre-configured and issued by him.

The first presenter begins her presentation and uses the interactive device to explain her main points with various text, drawings, and graphs. She forgets to insert her USB device into the interactive device before beginning, as instructed by the coordinator. After finishing up the first half of her presentation, everyone, including the first presenter, leaves the conference room for a lunch break.

A second presenter, who wants to get a head start on his presentation drawings during the lunch break, goes into the conference room to use the interactive device. He inserts his USB device into the interactive device in order to be able to save his work on it. Upon detection of the USB device into the interactive device, the interactive device authenticates the USB device to verify that it is an authorized USB device. Upon authentication of the USB device, the interactive device detects the first presenter's is still logged into the interactive device. Based on this detection, the interactive device stores the first presenter's work and logs out the first presenter By doing so, the interactive device preserves the state of the first presenter's work, despite the fact that she forgot to save it to her USB device before going to lunch. Because the coordinator did not specify an alternate default insertion action during pre-configuration, the second presenter's work will be stored directly onto his USB device.

When the first presenter returns from the break, she is horrified to see that her presentation is no longer on the interactive display and that the second presenter has started a new presentation. The second presenter assures her that her presentation is intact and quickly removes his USB device from the interactive device. Because every stroke input into the interactive device by the second presenter was saved onto the second presenter's USB device in near real-time, the second presenter is able to quickly end his session. Additionally, because the stroke input is saved on his USB device in database format with corresponding metadata, the interactive device will be able to automatically restore the second user's work so that he is able to continue where he left off before removing the USB device. Furthermore, because the default removal action is set to erase all traces of a presenter's stroke data upon detection of the removal of the USB device, the data is removed from the interactive device's volatile memory, as well as any other components of the interactive device, upon the ending of the second presenter's session.

After ending the second presenter's session, the first presenter is able to log back into the interactive device. Once the user is logged in, the interactive device restores the first presenter's session, completely intact. The first user then inserts and authenticates her USB device. Because the first presenter directly logged into the interactive device using the same credentials that were pre-configured onto her USB device by the coordinator, the interactive device determines that she is both the existing user and the user of the USB device. Therefore, the first presenter has the choice of continuing her existing session and/or creating a new session. Additionally, all of her work on the interactive device may be automatically saved to her USB device.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
    an interactive device comprising:
        an interactive display,
        a removable media port configured to receive a removable media device,
        wherein the interactive device is configured to:
            receive, via the interactive display, at least one stroke input, and
            automatically store the at least one stroke input onto the removable media device as stroke data when the removable media device is connected to the removable media port;
    the removable media device, comprising:
        a data repository configured to store:
            the stroke data, and
            metadata associated with the stroke data; and
        an ID file, comprising:
            a reference pointer to the metadata;
            user login credentials of a user of the removable media device;
            a default insertion action and a default removal action of the removable media device; and
            an identification device ID, wherein the identification device ID is at least partially based on a serial number of an identification device; and
    the identification device, wherein the identification device is used by the interactive device to authenticate the removable media device.

2. The system of claim 1, wherein the removable media device and the identification device are operatively connected.

3. The system of claim 2, wherein the removable media device and the identification device are physically connected.

4. The system of claim 1, wherein upon authentication of the removable media device, the default insertion action is performed by the interactive device.

5. The system of claim 1, wherein, prior to the stroke data being automatically stored on the removable media device, the user of the removable media device is authenticated by the interactive device using the user login credentials.

6. The system of claim 1, wherein prior to authenticating the removable media device by the interactive device, the removable media device is pre-configured to include the ID file.

7. The system of claim 1, wherein the interactive display comprises at least a touch-sensitive portion configured to receive the at least one stroke input.

8. The system of claim 1, wherein the at least one stroke input comprises a marking made by touch input or input via a digital marker.

9. The system of claim 1, wherein the data repository is configured to store the stroke data in a database format.

10. The system of claim 1, wherein, before storage onto the removable media device, the stroke data corresponding to the at least one stroke input is stored in a volatile memory of the interactive device.

11. The system of claim 10, wherein, after authentication of the removable media device, any stroke data stored in the volatile memory is copied to the removable media device.

12. The system of claim 10, wherein, after authentication of the removable media device, stroke data stored in the volatile memory is copied to the removable media device.

13. The system of claim 1, wherein the removable media device is a universal serial bus (USB) device.

14. The system of claim 1, wherein the identification device is a near field communication (NFC) device.

15. The system of claim 1, wherein the metadata comprises a last display state of the interactive display.

16. A system comprising:
    an interactive device comprising:
        an interactive display,
        a removable media port configured to receive a removable media device,
        wherein the interactive device is configured to:
            receive, via the interactive display, at least one stroke input, and
            automatically store the at least one stroke input onto the removable media device as stroke data when the removable media device is connected to the removable media port;
    the removable media device, comprising:
        a data repository configured to store:
            the stroke data, and
            metadata associated with the stroke data; and
        an identification device, wherein the identification device is used by the interactive device to authenticate the removable media device,
    wherein the interactive device further comprises a wireless communication interface configured to receive a serial number from the identification device; and
    wherein the interactive device uses the serial number to authenticate the removable media device.

17. The system of claim 16, wherein authenticating the removable media device comprises comparing the serial number of the identification device to an identification device ID stored on the removable media device.

18. A system comprising:
    an interactive device comprising:
        an interactive display,
        a removable media port configured to receive a removable media device,
        wherein the interactive device is configured to:
            receive, via the interactive display, at least one stroke input, and automatically store the at least one stroke input onto the removable media device as stroke data when the removable media device is connected to the removable media port;

the removable media device, comprising:
- a data repository configured to store:
  - the stroke data, and
  - metadata associated with the stroke data; and
- an ID file, comprising:
  - a reference pointer to the metadata;
  - user login credentials of a user of the removable media device;
  - a default insertion action and a default removal action of the removable media device; and
  - an identification device ID associated with an identification device; and the identification device, wherein the identification device is used by the interactive device to authenticate the removable media device.

19. The system of claim 18, wherein interactive device is configured to authenticate the removable media device using the identification device ID.

\* \* \* \* \*